US010033873B1

(12) United States Patent
Roberts et al.

(10) Patent No.: US 10,033,873 B1
(45) Date of Patent: Jul. 24, 2018

(54) ONE-CLICK CONFERENCE CALLING

(71) Applicant: T-Mobile USA, Inc., Bellevue, WA (US)

(72) Inventors: Shanelle Lynn Roberts, Seattle, WA (US); Nathaniel Ambros Meyr, Bothell, WA (US); Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/485,588

(22) Filed: Apr. 12, 2017

(51) Int. Cl.
*H04M 3/56* (2006.01)
*H04M 1/725* (2006.01)
*H04M 1/2745* (2006.01)

(52) U.S. Cl.
CPC ..... *H04M 3/563* (2013.01); *H04M 1/274566* (2013.01); *H04M 1/72583* (2013.01); *H04M 2207/18* (2013.01); *H04M 2250/62* (2013.01)

(58) Field of Classification Search
CPC ......... G03B 27/32; G03B 35/14; G09F 9/313; G09G 1/20; H04M 3/56; H04M 1/725; H04M 1/2745
See application file for complete search history.

(56) References Cited

U.S. PATENT DOCUMENTS

| | | | | |
|---|---|---|---|---|
| 2008/0168361 A1* | 7/2008 | Forstall | ................. | G06F 3/0488 715/753 |
| 2011/0228922 A1* | 9/2011 | Dhara | ................. | H04L 12/1818 379/202.01 |
| 2012/0269335 A1* | 10/2012 | Goguen | ............. | H04L 63/0407 379/202.01 |

* cited by examiner

*Primary Examiner* — Frantz Bataille
(74) *Attorney, Agent, or Firm* — Lee & Hayes, PLLC

(57) ABSTRACT

Systems and methods for enabling users to connect to conference calls. The system can include a conference line on user equipment (UE) to enable users to connect to a dedicated conference line. The conference line can include a conference line number, a host code, and/or a participant code. The conference line can provide a graphical user interface (GUI) to enable the user to choose how to connect to the conference bridge—i.e., using the host code or participant code. The system can also include conference contacts that enable the user to connect to external conference bridges. The conference contacts can include a conference number, a host code, and/or a participant code. The system can provide an interface to enable the user to select the user code or the participant code or can create two separate conference contacts—one for each code.

16 Claims, 21 Drawing Sheets

ONE-CLICK CONFERENCE CALLING

BACKGROUND

Conference and video calls are a common tool today to enable people in disparate locations to talk to and, in the case of video calls, see each other to conduct meetings, brainstorming sessions, etc. A conference bridge, which can be software, hardware, or a combination of software and hardware, can be used to enable users to dial in to a common number. The conference bridge then connects each caller to enable the users to hear and, in most cases, speak to one another.

A variety of services exist that provide conference calling capabilities. These services can be provided via telephone, cellular, and internet connections. Users may dial into a conference bridge, provide a conference ID, and then provide a "host" or "participant" code. The host is generally the organizer or presenter of the meeting. The number of participants is limited only by the capabilities of the conference bridge and associated connections.

DETAILED DESCRIPTION

Figure 1:
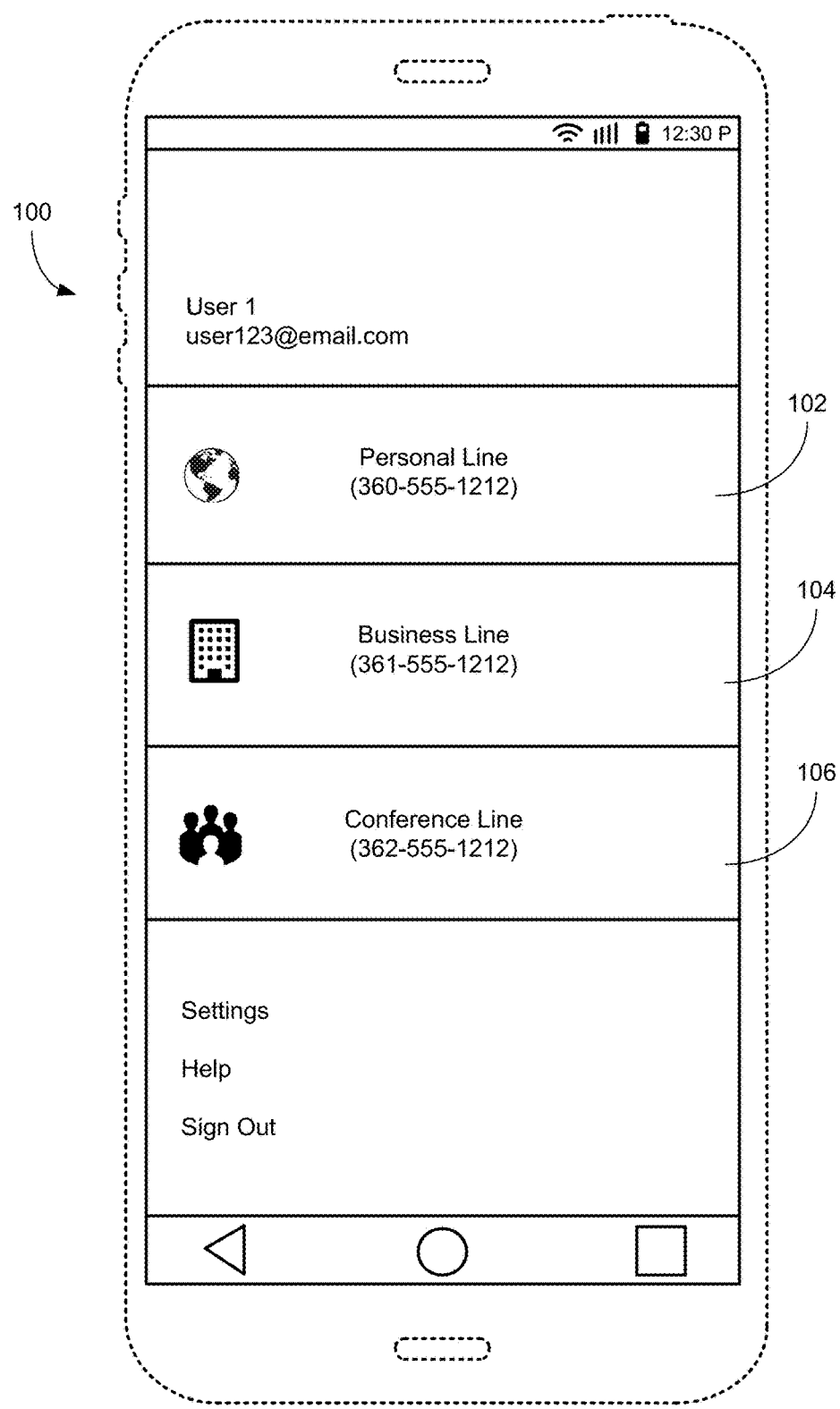
FIG. 1 depicts a user equipment (UE) that includes multiple phone lines, including a conference line, in accordance with some examples of the present disclosure.

Examples of the present disclosure can comprise systems, graphical user interfaces (GUIs), and methods for providing simplified conference calling services on communications devices used for voice and video calling. These communications devices can include many devices used for electronic communications including, for example, cellular telephones, smartphones, tablets, laptops, and desktop computers, among other things (collectively, user equipment or "UEs"). The system can include the ability to store conference call information as a "contact" in the contacts of the UE or as a separate line for the UE. The system enables a user to start or join a conference call with one or two button presses, rather than having to dial a telephone number, then a conference number, then a participant code.

To simplify and clarify explanation, the system is described below for use with a cellular or land-line based telephonic conference call. Once of skill in the art will recognize, however, that the system could also be used for other conference call features such as, for example, video conferencing, chat, and, skype. Thus, the system can be used anytime a user is required to dial a phone number or web address, for example, and then provide additional access codes. Similarly, while described below for use with cellular communications systems, the system could also be used with other types of wired and wireless communications systems; or indeed, any time a connection to a service with multiple access codes is needed.

As mentioned above, teleconferencing services, whether audio or audio and video based, generally require a user to dial a telephone number or other address (e.g., a uniform resource locator, or URL), enter a conference code, and then enter either a participant code or a host cost, as applicable. The conference code enables a conference bridge to identify the call to which the user is trying to connect, while the participant code or host code provides a layer of security and identifies the user as either a participant (joining the call) or a host (establishing the call).

Regardless, the user is required to input numerous numbers to access the conference call. The user generally must dial the 7-10 digit phone number associated with the conference bridge. In some cases, when the conference bridge serves multiple users, the user can be asked to then enter a 7-12 digit conference ID to identify a particular conference call and, in some cases, a pound symbol or star. Finally, the user may have to enter another 7-12 digit code identifying the user as a participant or a host and, in some cases, another pound symbol or star. Thus, having dialed somewhere between 21 and 34 numbers, the user is connected to the conference call. This can be very difficult, particularly on a mobile phone.

To this end, it would be useful to enable the conference number and codes to be stored in a UE as a contact or a separate line and to provide one-touch conference access. A system with the ability to store the conference numbers and codes as a contact, for example, eliminates the need for the user to dial the above-mentioned numbers manually. In addition, the system can provide the appropriate pauses between each number and/or a specific delay between each number to ensure the required information is received by the conference bridge. It is to such systems and methods that examples of the present disclosure are primarily directed.

As mentioned above, conference calling is provided by a variety of service providers using a variety of technologies. One example is a service provider that provides a conference bridge a part of a cellular plan. Thus, when opening an account with the cellular provider, a user may receive access to multiple "lines," at least one of which is a conference bridge.

As shown in FIG. 1, in this configuration, a UE 100 can include a particular line for personal calls, or a personal line 102, a particular line for business calls, or a business line 104, and a particular line for conference calls, or a conference line 106. Thus, when a user receives a call on the business line 104, for example, the user knows that the call is likely from a business contact as opposed to a personal contact. Similarly, If the user makes a call from the business line, the appropriate number and caller ID appears on the recipient's phone. Thus, the UE 100 can act as a business and personal phone, with two separate numbers and voicemail boxes, among other things.

Similarly, in some examples, the UE 100 can also include a conference line 106. Unlike the personal and business line, however, the conference line 106 can include additional information to enable the conference line to access a conference bridge directly and to enable one- or two-touch dialing, as discussed below. Thus, if the user's account includes five separate lines, in this case, the user has designated three for use and has two remaining.

Figure 2:
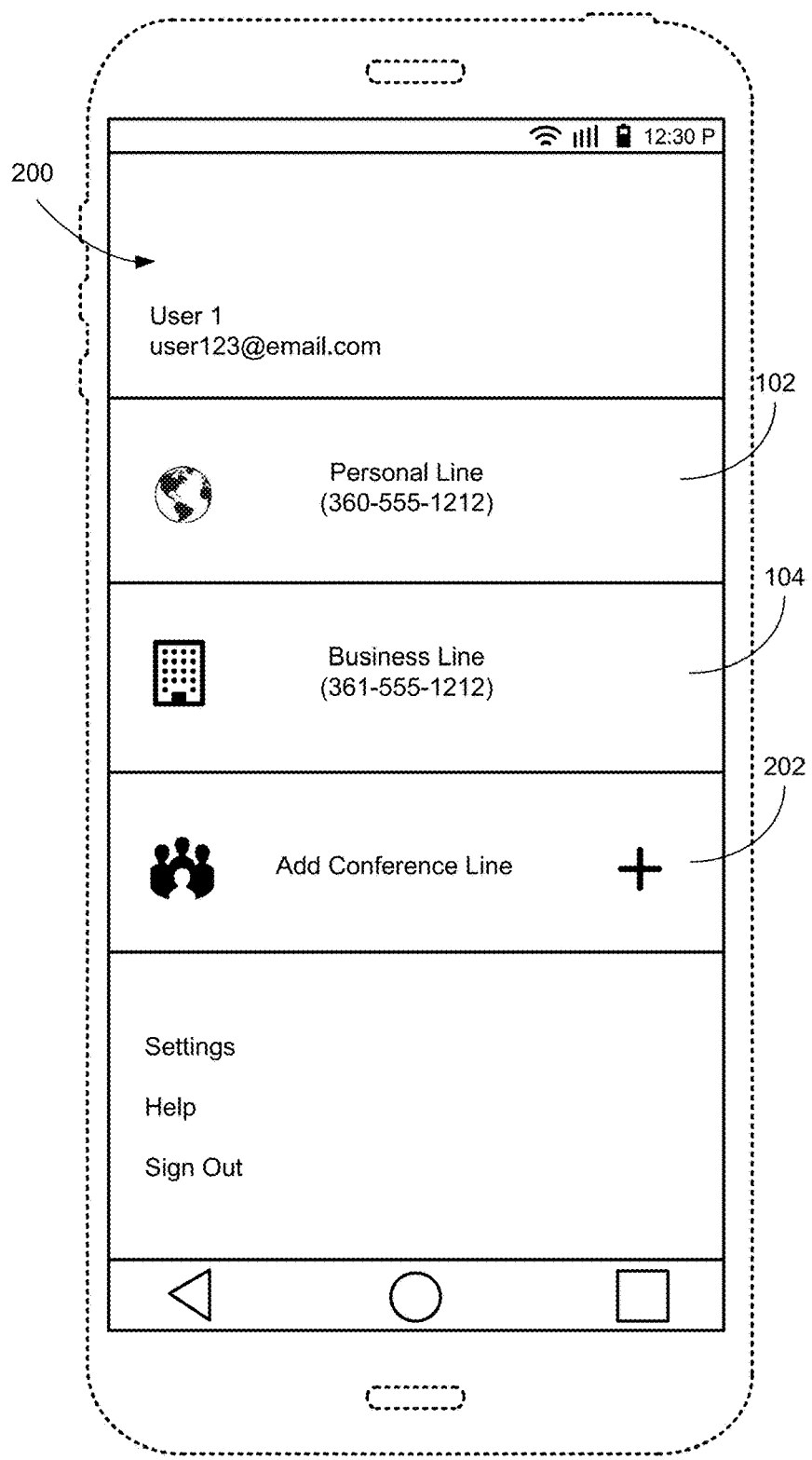
FIGS. 2-4 depicts a graphical user interface (GUI) for adding a conference line to a UE, in accordance with some examples of the present disclosure.

FIG. 2 depicts the UE 100 prior to the conference line being added. Thus, the GUI 200 of the UE 100 can include listings for the personal line 102, business line 104, and an add conference line button 202. This feature may be accessed in the settings section of the UE 100, for example, and can enable one or more conference lines 106 to be set up on the UE 100. In some cases, the user's account may include a limited number of conference lines 106 (e.g., two or three conference lines 106 and seven lines total). Thus, if a user has already set up the allotted number of conference lines 106, the add conference line button 202 may be removed from the GUI 200.

Figure 3:
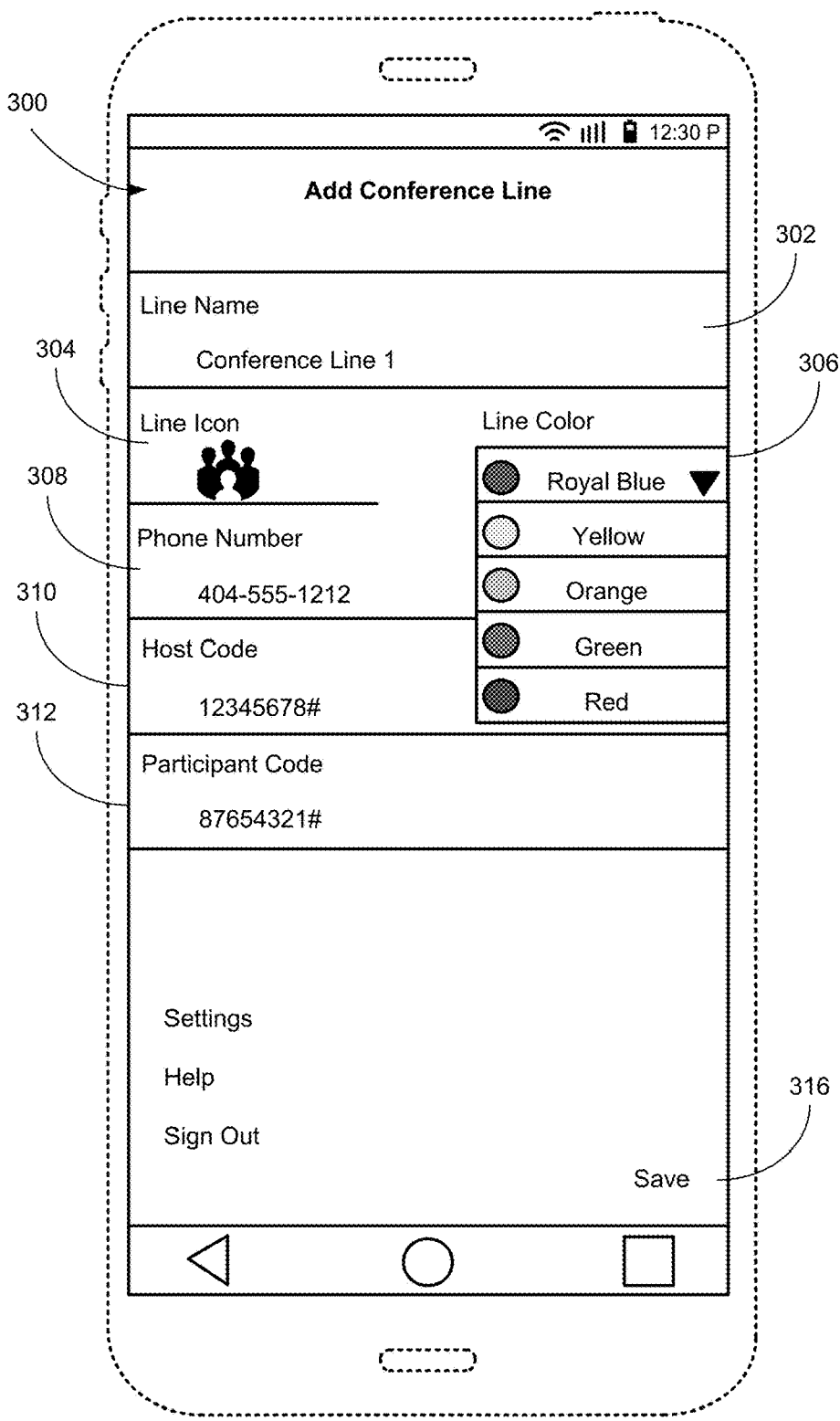

As shown in FIG. 3, activating the add conference line button 202 (e.g., selecting the conference line button 202 by pressing the appropriate location on a touchscreen) can evoke a second GUI 300 to enable the user to enter the appropriate information. The GUI 300 can include, for example, entries for the line name 302, line icon 304, line color 306, conference bridge number 308, host code 310, and/or participant code 312. The line name 302 can enable the user to name each conference line. Thus, if the user has two separate business lines 104, one for Company A and one for Company B, the user may wish to create a conference line 106 for each. In this case, the user may assign the line name 302 for each—e.g., "Company A Conference Line" and "Company B Conference Line."

Similarly, the user may wish to include an icon to enable the user to easily identify which conference line 106 to use for a particular call. The line icon 304 could include a company logo, for example, a picture, or other indicator of the purpose of a particular conference line 106. A user may also use different icons to distinguish between business and personal conference lines, as applicable. The user can insert a suitable file (e.g., a .jpg or .bmp) into the line icon 304 location by dragging and dropping, locating the file in a memory of the UE 100, or selecting from images provided on the UE 100 by the service provider or manufacturer.

In some examples, to further distinguish a conference line 106 from other conference lines 106, personal lines 102, or business lines 104, the user may also be able to select the line color 306. As shown, the line color 306 can provide a drop-down menu, for example, to provide a variety of included colors. Users may also be able to select or create custom colors for the line color 306.

The user can then enter the conference bridge number 308, host code 310, and/or participant code 312. The conference bridge number 308 can comprise the number of the conference bridge associated with the UE 100. Thus, as discussed below, the conference bridge number 308 will generally be different from the number associated with the conference line 106. Thus, when selected the user will be calling from the number associated with the conference line 106 to the conference bridge number 308. In some examples, when the user has entered all of the necessary information, the GUI 300 can also include a save button 316, or similar.

Figure 4:
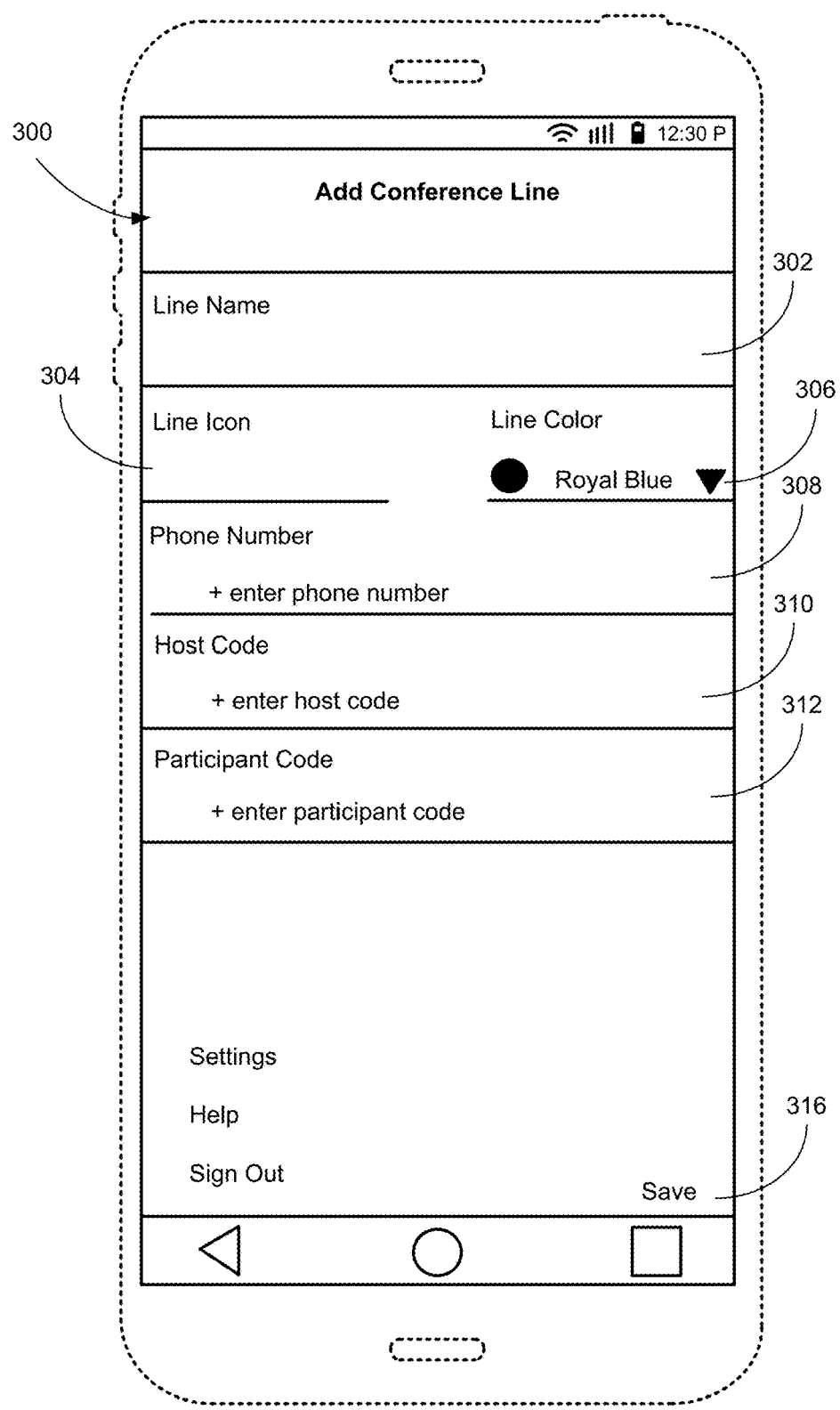

Example data is shown in FIG. 4. In this case, the user has provided "Conference Line 1" for the line name 302. The user has also selected an icon indicative of a conference for the line icon 304, for example, royal blue for the line color 306. The user has then entered the conference bridge number 308 (404-555-1212), which, as shown below, is different than the number for the conference line 106 (i.e., the number the user will call the conference bridge from).

In this case, the user has also entered a host code 310 and a participant code 312 for the conference bridge. Of course, in some examples, the user may enter only the host code 310 or the participant code 312. Thus, for a conference line 106 used most for hosting conference calls, the user may only enter a host code, and vice-versa. If the conference line 106 is used for multiple purposes, on the other hand, the user may host some calls and participate in others. In this case, the user can enter both the host code 310 and participant code 312 information. The user can then select the save button 316 to save the information to the UE 100.

Figure 5:
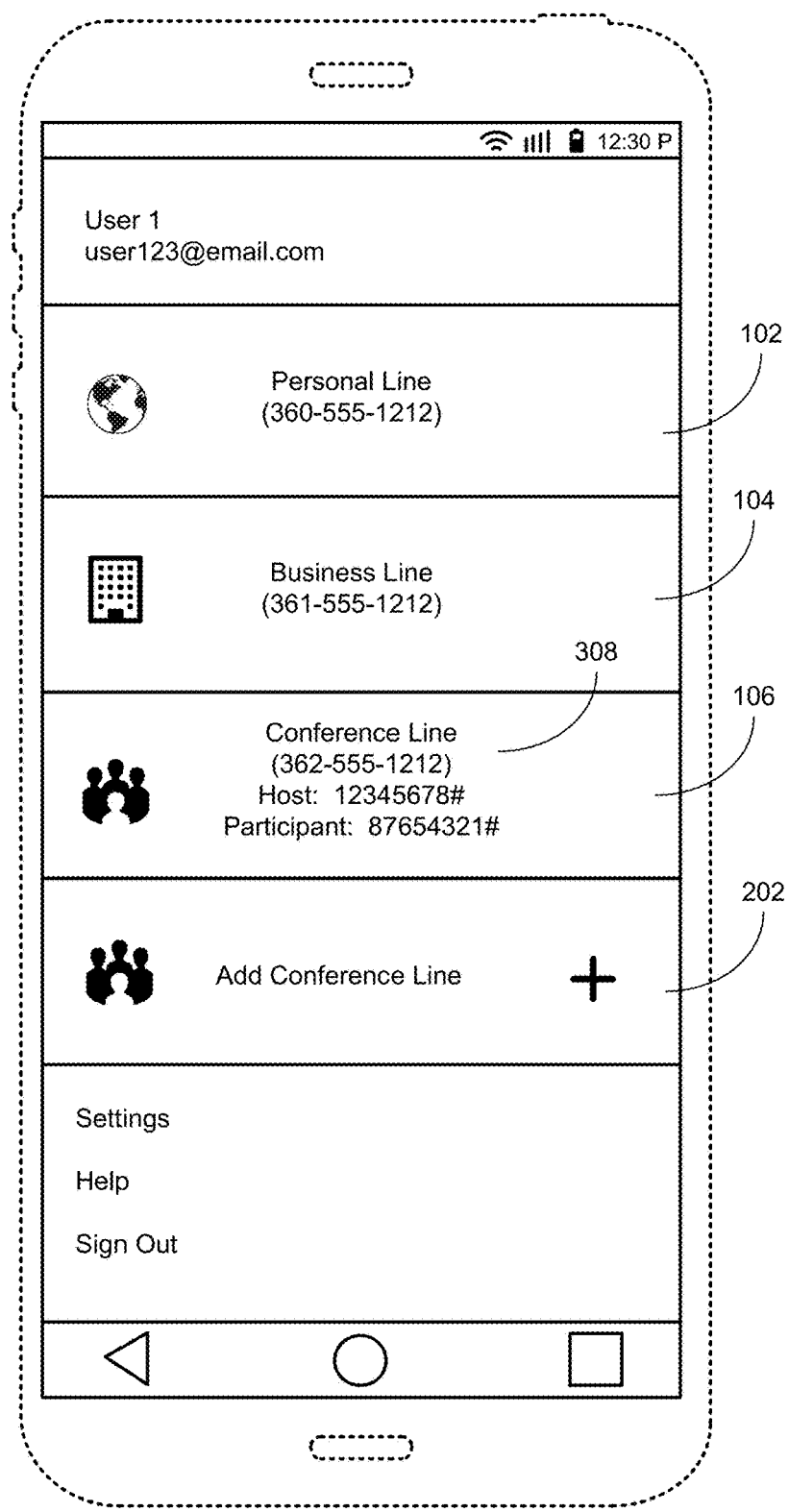
FIG. 5 depicts a UE that includes multiple lines, including a conference line with associated details displayed for the conference line, in accordance with some examples of the present disclosure.

FIG. 5 depicts the UE 100 with the conference line 106 added. As shown, the conference line includes conference bridge number 308 the aforementioned conference bridge number 308. In some examples, the UE 100 may also display the host code 310, participant code 312, and other information related to the conference line 106.

Figure 6:
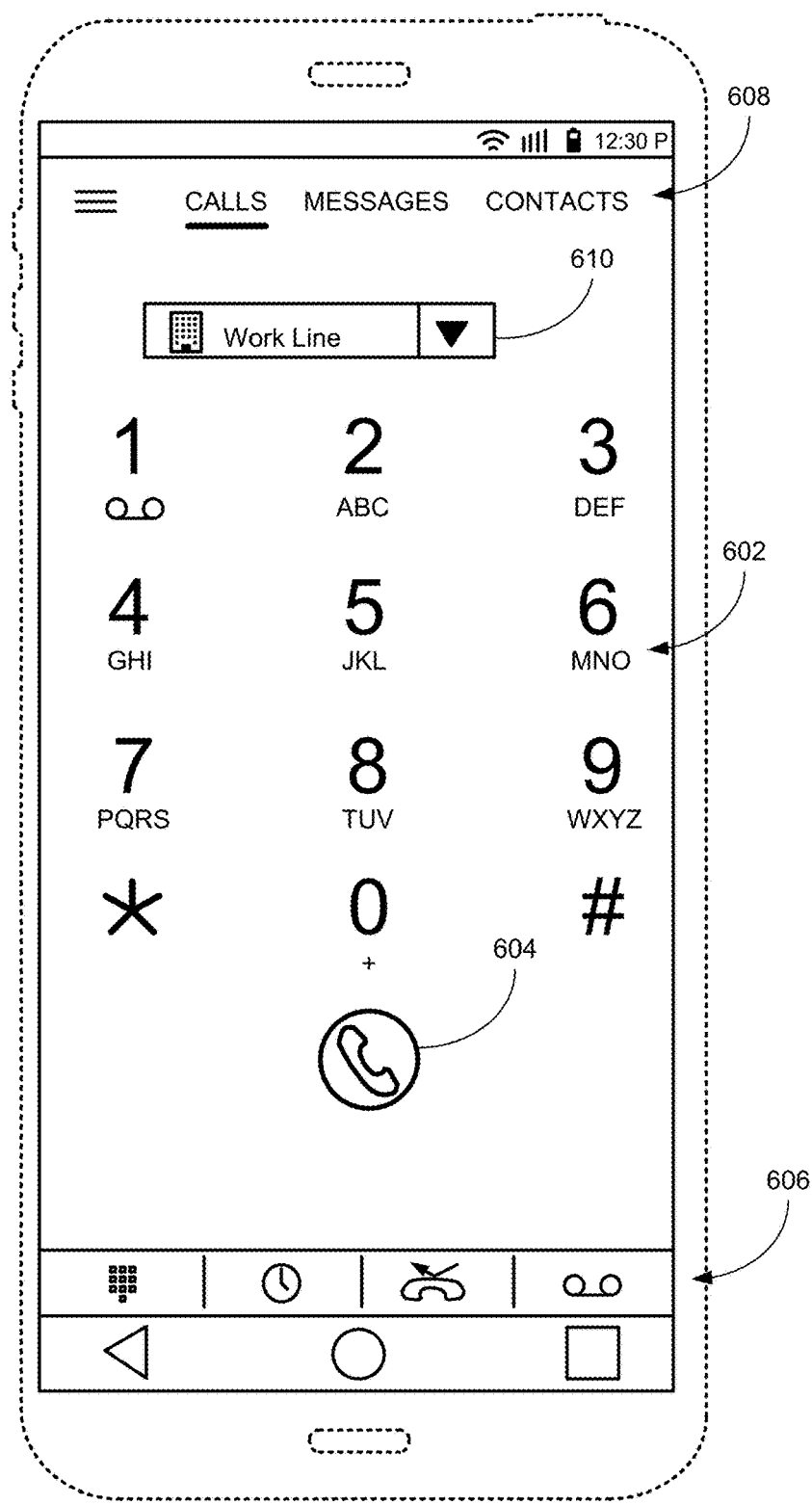
FIGS. 6 and 7 show a GUI to enable a user to select a particular line for calling, including a conference line, in accordance with some examples of the present disclosure.
Figure 7:
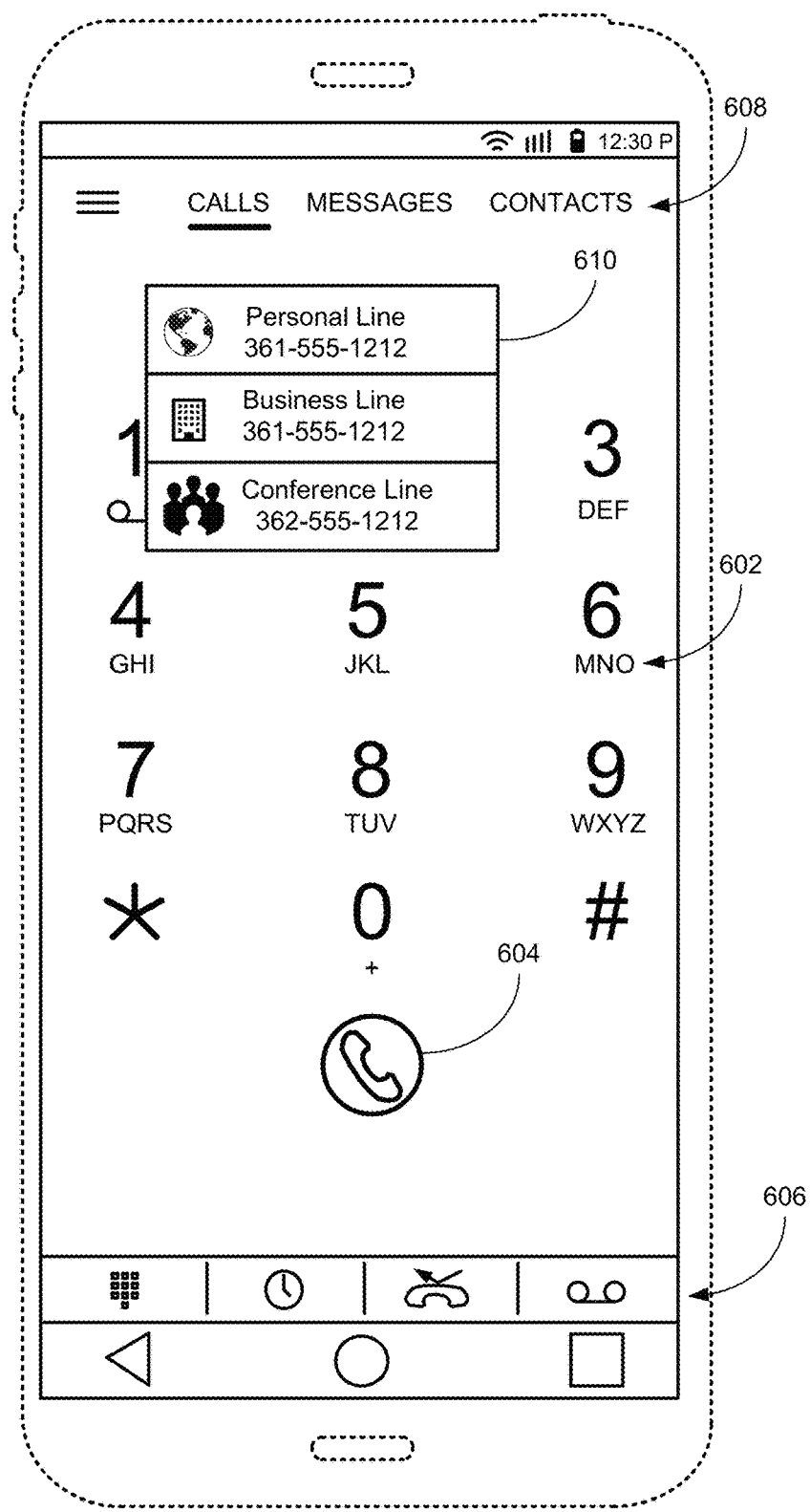
Figure 8:
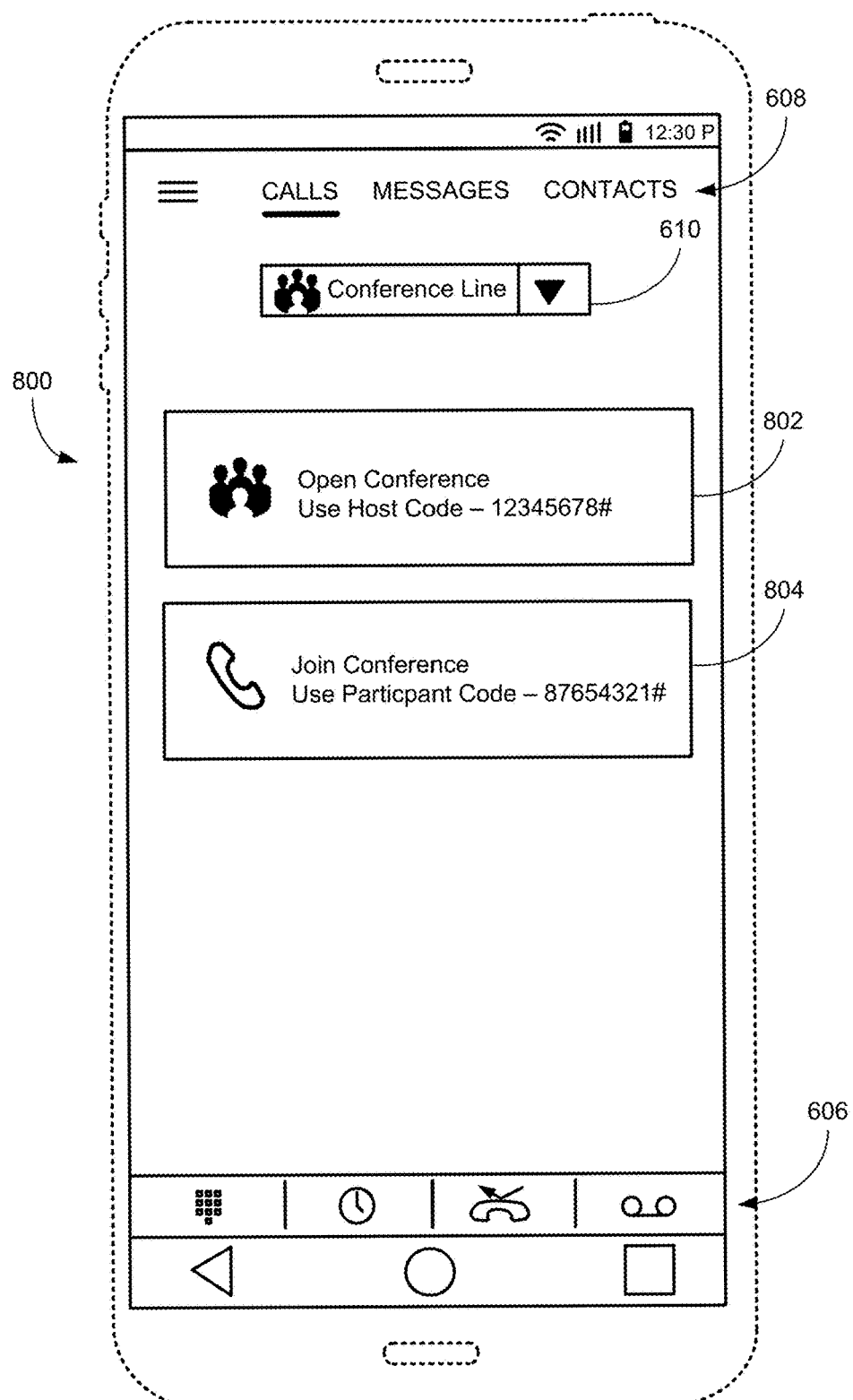
FIG. 8 depicts a conference GUI that enables the user to select a host or participant code to connect to the conference line, in accordance with some examples of the present disclosure.

FIGS. 6-8 depict the process of selecting the conference line for use. As shown, like many phones and other communications devices, the UE 100 can include a dialer 600. As per normal, the dialer 600 can include a keypad 602, a call button 604, and various other functions 606 and menus 608. The keypad 602 can comprise, for example, actual buttons, a touchscreen, or voice commands and can be used on the conventional manner to enter numbers and/or letters. Similarly, the call button 604 can be used to initiate calls once a number is entered on the keypad 602 and to terminate calls when appropriate.

In this case, however, the dialer 600 can also comprise a line selector 610. The line selector 610 can enable the user to switch between the various lines 102, 104, 106 prior to making a call. As shown in FIG. 7, in some examples, the line selector 610 can comprise a drop-down menu that, when selected, displays all of the lines 102, 104, 106 currently configured on the UE 100. To select a line 102, 104, 106, the user can touch the screen, scroll down and hit enter, or provide a voice command, among other things.

When the user selects the personal line 102 or business line 104, the dialer 600 can behave in a conventional manner and enable the user to enter a number on the keypad 602 and then press the call button 604 to place a call. When the user selects the conference line 106, on the other hand, one of at least two things can happen. If the user has entered only a host code 310 or only a participant code 312 for the selected conference line 106, then the user can simply selected the appropriate conference line 106 and press the call button 604. As discussed below, the dialer 600 can then automatically dial the conference bridge number 308 and the appropriate code 310, 312, including any necessary pauses or delays. In this case, the user is connected to the conference bridge with only two inputs (select the conference line 106 and select the call button 604), as opposed to the aforementioned 21 to 33.

If, on the other hand, the user has entered both a host code 310 and a participant code 312 for a particular conference line 106 then, as shown in FIG. 8, a conference GUI 800 can open to provide a host button 802 and a participant button 804. As then names imply, the host button 802 and a participant button 804 can enable the user to select the host code 310 or the participant code 312 prior to dialing. Obviously if the user selects the host button 802, the dialer 600 dials the conference bridge number 308 followed by the attendant host code 310. If the user selects the participant button 804, the dialer 600 dials the conference bridge number 308 followed by the attendant participant code 312. In this case, the user is connected to the conference bridge with only three inputs (select the conference line 106, select the call button 604, and select the host button 802 or participant button 804).

Figure 9:
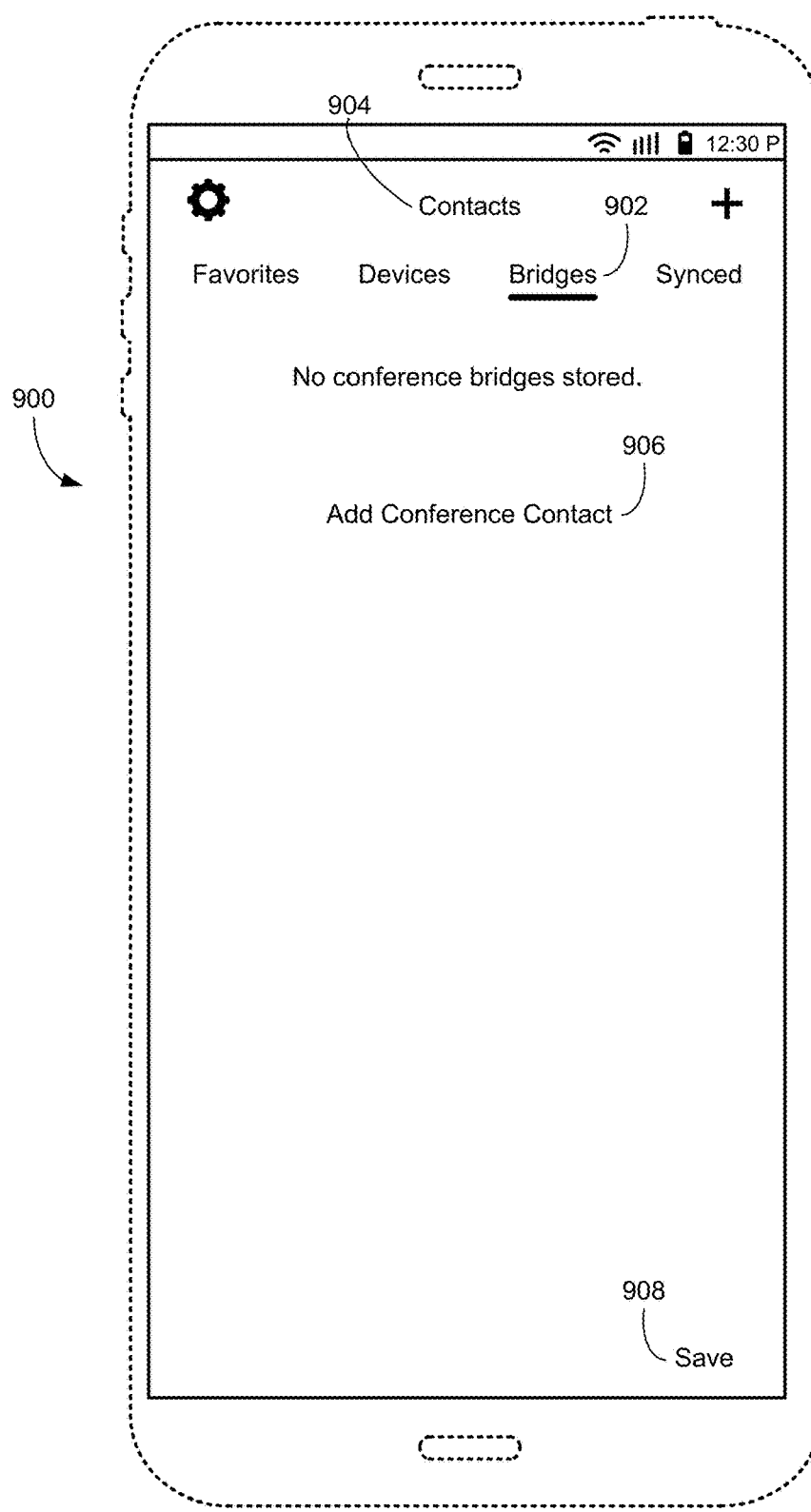
FIGS. 9-11 depict a GUI to enable a user to add a new conference contact, in accordance with some examples of the present disclosure.

In other examples, as shown in FIG. 9, a conference bridge can be stored as a "contact" in the UE 100 like other numbers. In this case, however, provisions can be made to provide the host or participant codes, and any other inputs, at the appropriate time when dialing. FIG. 9 depicts a GUI 900 with a bridges tab 902 within a contacts 904 list in the UE 100. As shown, in this case, the UE 100 does not contain any conference bridge contacts.

To this end, the contact GUI 900 can also include a conference contact button 906. When selected, the conference contact button 906 can enable the user to add a conference bridge as a contact. In this manner, the user can select a conference all like any other contact and, in some cases, have one touch calling like other contacts. This configuration call also enable the user to send the conference contact to other users via text message and e-mail, for example, enabling other users to easily store and use the conference bridge. In some examples, the user can include the conference contact in a meeting request, for example, obviating the need to provide the conference bridge information separately. As before, the GUI 900 can also include a save button 908 to enable the user to save the entered information to the UE 100.

Figure 10:
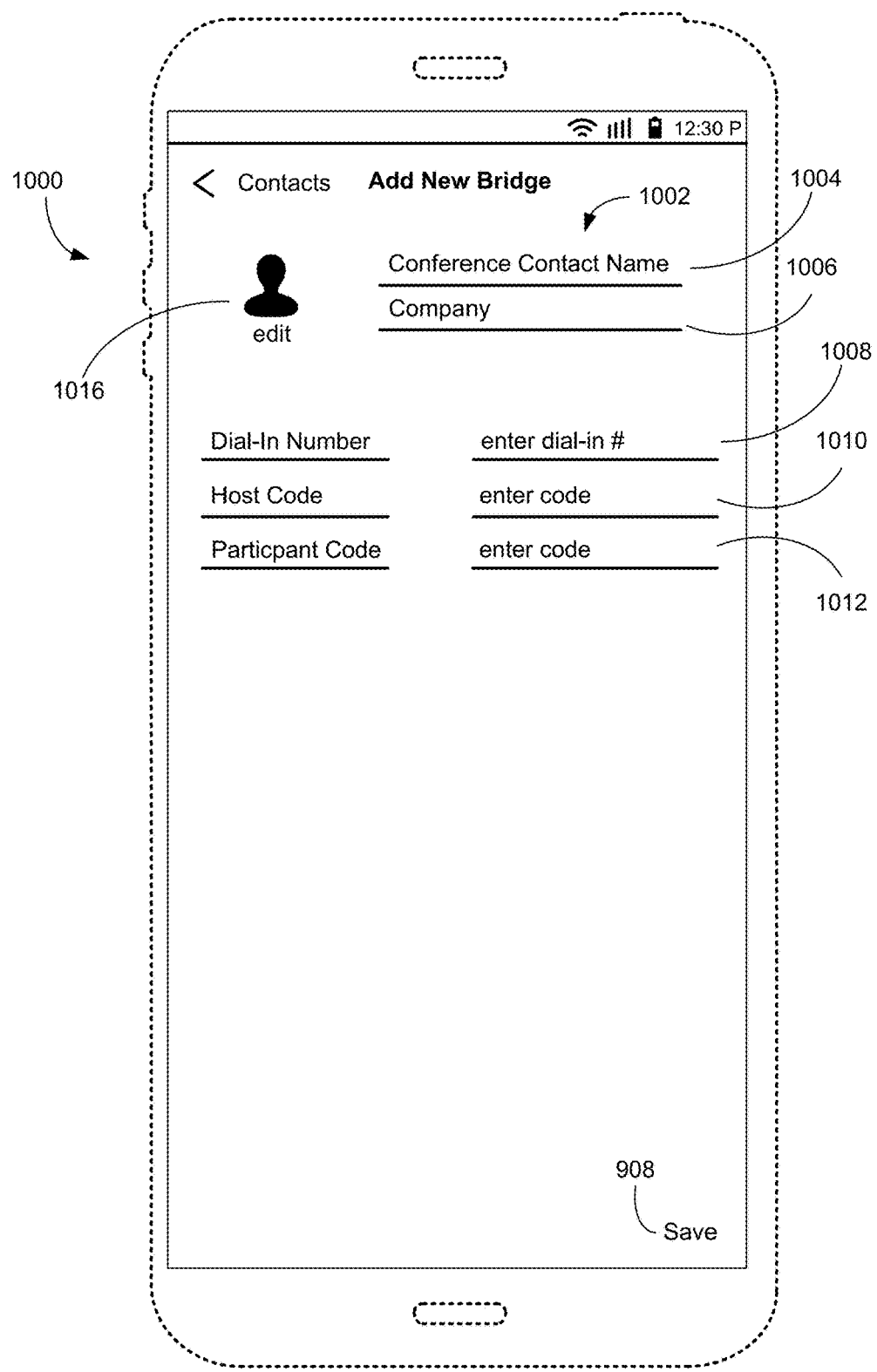

As shown in FIG. 10, selecting the conference contact button 906 can open a conference contact GUI 1000 that enables the user to enter the relevant information. In this case, as opposed to providing a separate conference line 106, the conference bridge information 1002 is simply stored as a contact. As before, the conference bridge information 1002 can include a conference contact name 1004, conference contact company 1006, the conference bridge number 1008 for the conference bridge, and the host code 1010 and/or participant code 1012.

In some examples, to visually distinguish various conference contacts in the user's contacts list, the GUI 1000 can also include a conference avatar 1016. The conference avatar 1016 can comprise almost any graphical symbol, picture, logo, or other visual reference. In some examples, the user may be able to choose from various clip art, for examples, or may be able to download pictures (e.g., .jpg. or .tiff) from the internet, among other things. In some cases, the conference contact GUI 1000 can also include additional entries for mailing addresses, web address, e-mails, and other information related to the conference contact.

Figure 11:
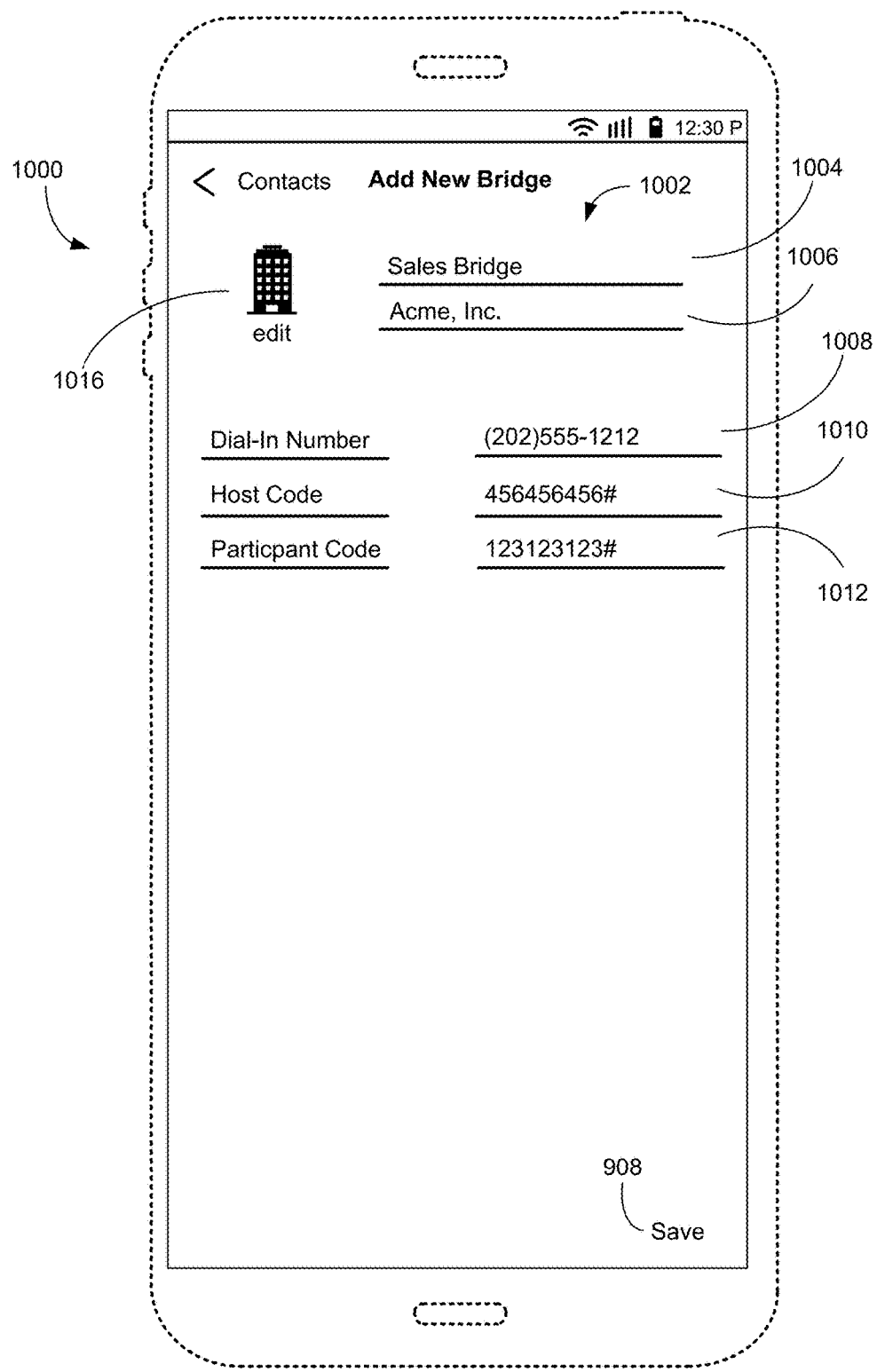

As example is provided in FIG. 11. In this case, the user has entered "sales bridge" as the conference contact name 1004 and "Acme, Inc." in the conference company name. The user has also entered the conference bridge number 1008 for the relevant conference bridge—(202)555-1212. Finally, in this case, the user has entered codes for both the host code 1010 (456456456#) and the participant code (123123123#). Thus, for this particular conference contact, the user can dial in as a host or a participant. Of course, another conference contact may include only the host code 1010 or the participant code 1012.

The user has also selected an office building as the conference avatar 1016. This could indicate that the conference contact is a business contact, for example, or an architect. This could also be the logo for the company associated with the conference contact. As mentioned above, the conference avatar 1016 can comprise many different graphical representations and can aid the user is selecting the correct conference contact when dialing. When all information has been entered, the user can select the save button 908 to save the information to the UE 100.

Figure 12:
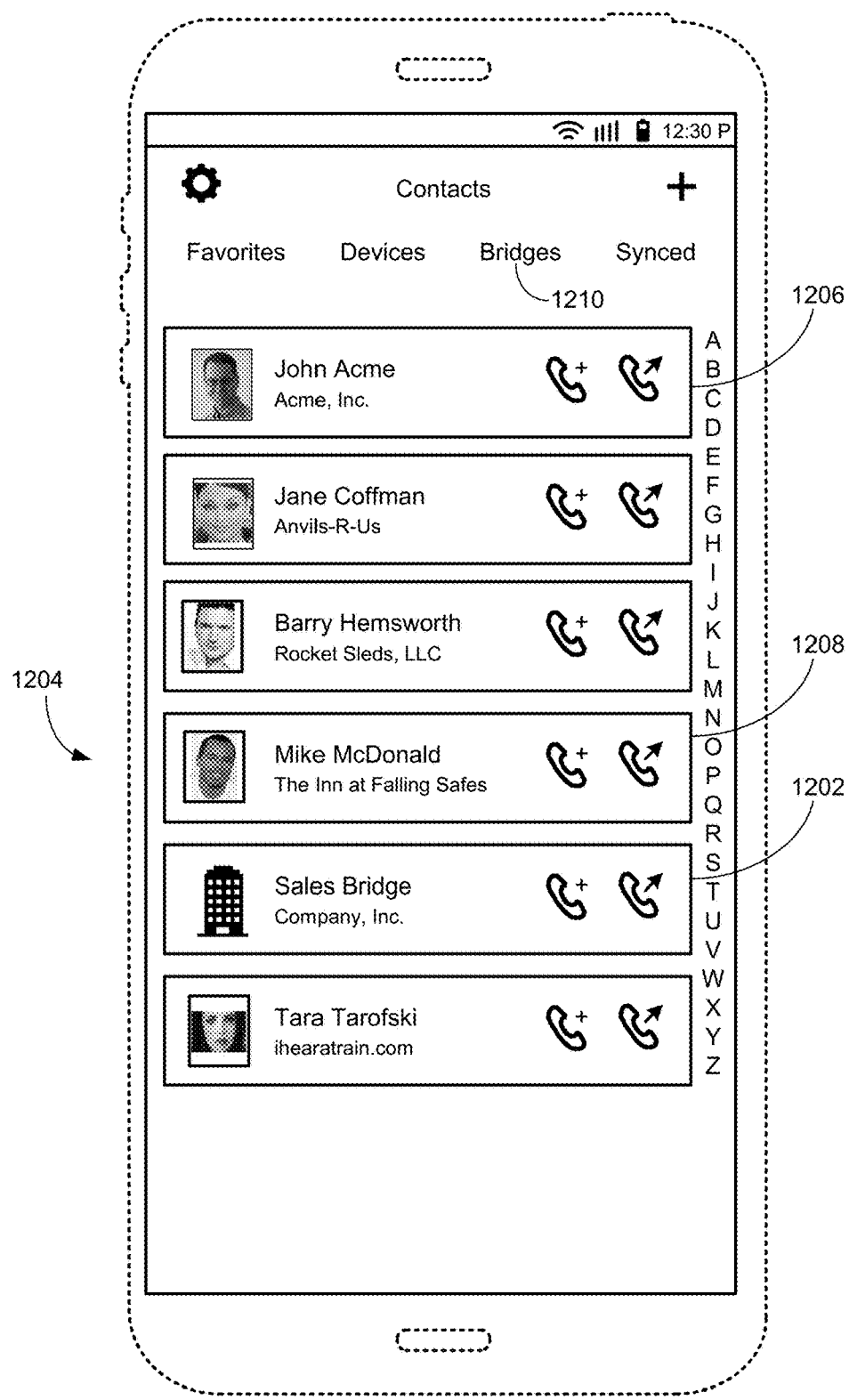
FIG. 12 depicts a contacts screen of a UE with a single conference contact included, where the conference contact includes both a host code and a participant code in the same contact, in accordance with some examples of the present disclosure.

As shown in FIG. 12, once completed and saved, the conference contact 1202 can be displayed like any other contact in the user's contact list 1204. In some examples to distinguish between various types of contacts—e.g., conference contacts 1202, business contacts 1206 and personal contacts 1208—each type of contact may have a different color outline, for example, a different color background, or other distinguishing features. In some examples, to further ease selection, the contact list 1204 can include a separate bridges tab 1210 that, when selected, only displays the conference contacts 1202 and excludes other types of contacts 1206, 1208.

When the user selects a conference contact 1202 from the contacts list 1204 that includes only a host code 1010 or a participant code 1012, the UE 100 can simply dial the conference bridge number 1008 followed by the host code 1010 and the participant code 1012, with any necessary pauses. In this configuration, the system provides one-touch conference dialing.

As discussed above, however, some conference contacts 1202 can include both a host code 1010 and a participant code 1012. Thus, when selecting a conference contact 1202 with both, the user can also choose whether to connect using the host code 1010 or the participant code 1012. This may be useful for work conference calls that are sometimes hosted by the user and other times hosted by colleagues.

Figure 13:
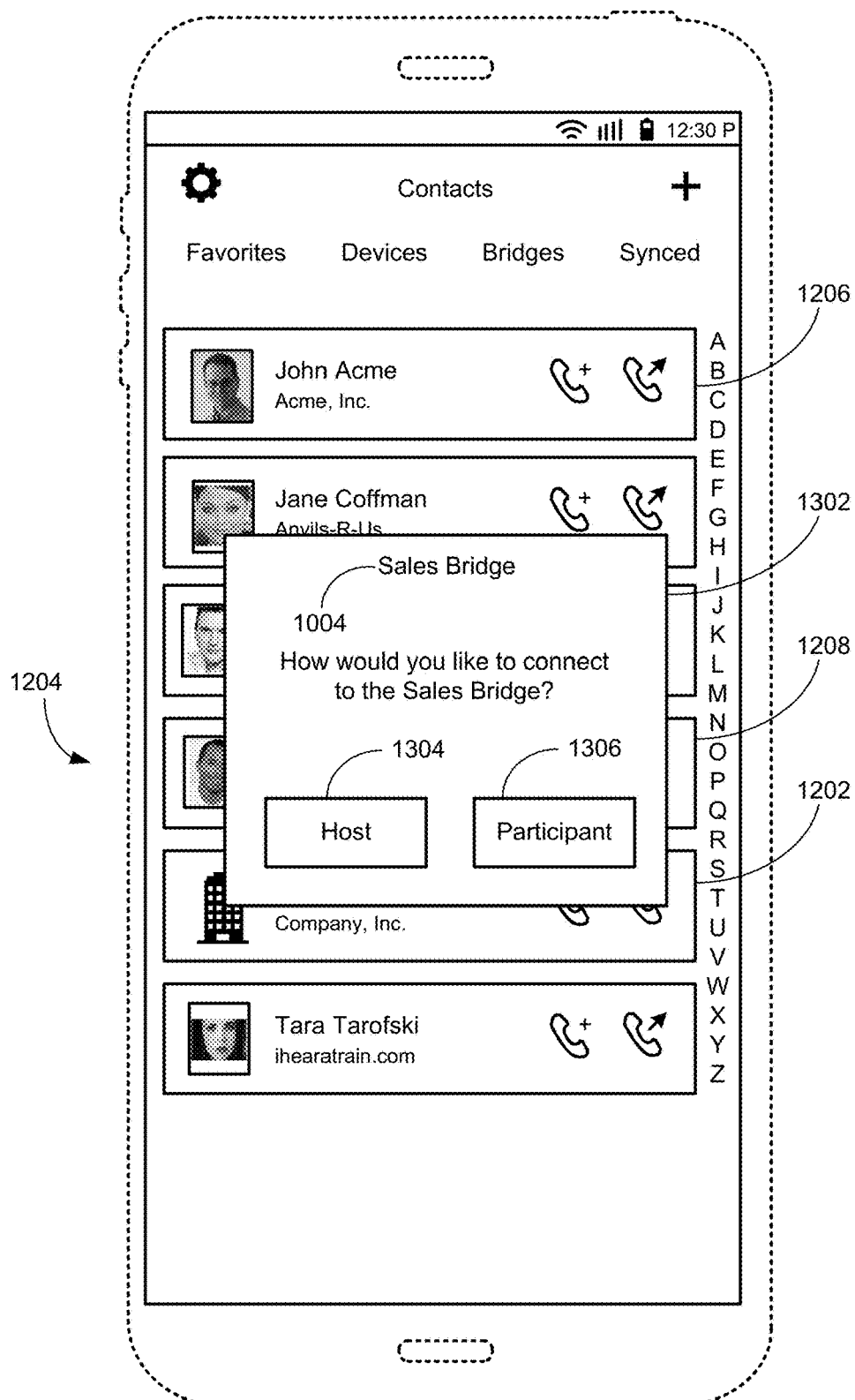
FIG. 13 depicts an interface that enables the user to select the host or participant code when connecting to a conference bridge using a conference contact with both a host code and a participant code, in accordance with some examples of the present disclosure.

To this end, as shown in FIG. 13, when a conference contact 1202 is selected that includes both a host code 1010 and a participant code 1012, the system can provide an interface 1302 (e.g., a "pop-up") to enable the user to easily select the appropriate code 1010, 1012. The interface 1302 can include, for example, the conference contact name 1004 to ensure the user has selected the desired conference contact 1202 and a host button 1304 and participant button 1306. Obviously, selecting the host button 1304 can cause the UE 100 (or the dialer 600) to dial the conference bridge number 1008 followed by the host code 1010, while selecting the participant button 1306 can cause the UE 100 (or the dialer 600) to dial the conference bridge number 1008 followed by the participant code 1012. In this configuration, the system provides the user with two-click conference dialing (selecting the conference contact 1202, then selecting the appropriate button 1304, 1306).

Figure 14:
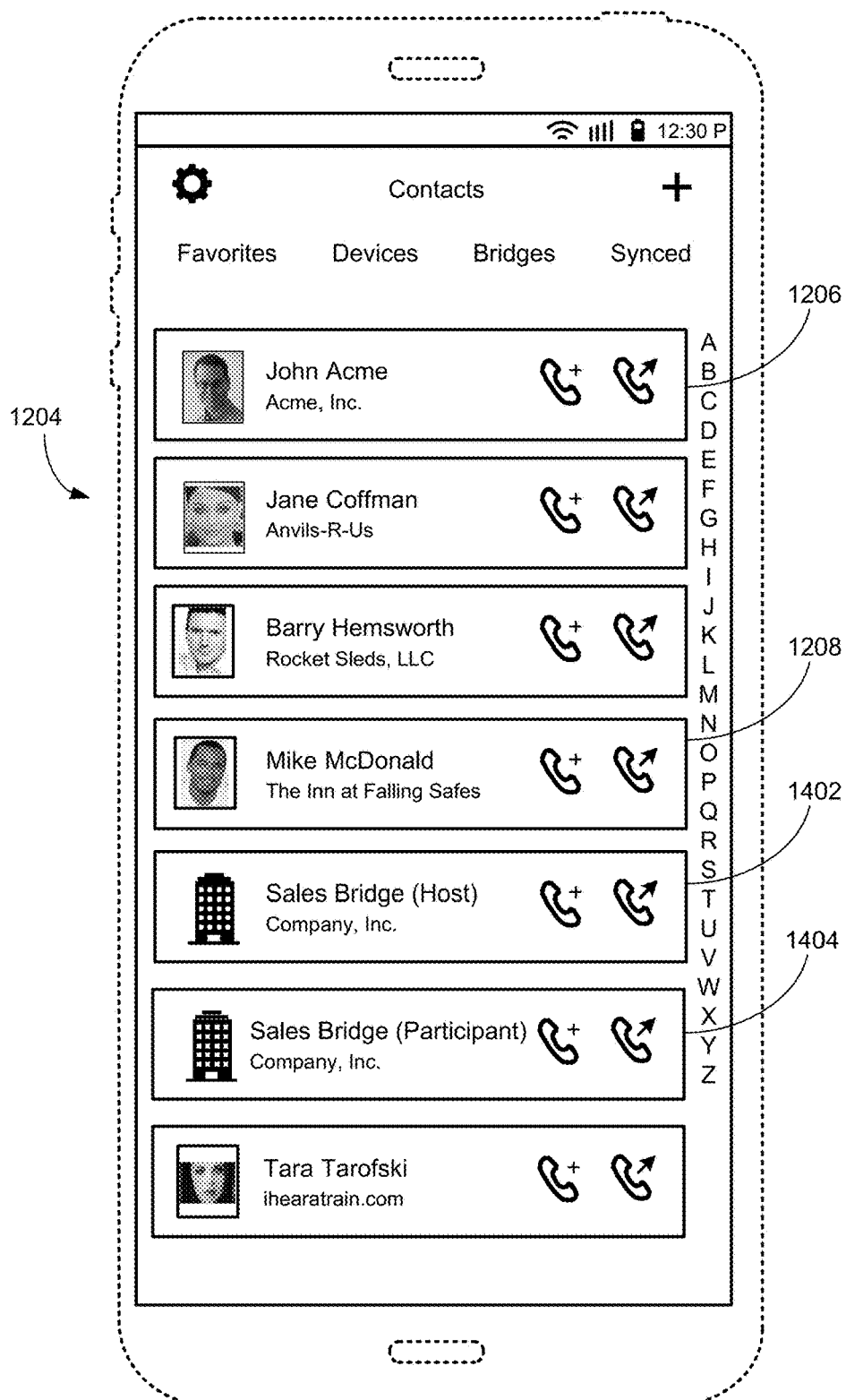
FIG. 14 depicts a contacts screen of a UE with a two conference contacts included, where each conference contact includes a host code or a participant code, in accordance with some examples of the present disclosure.

As shown in FIG. 14, in other examples, for conference contacts 1202 that include both codes 1010, 1012, the system can simply display two separate conference contacts 1402, 1404. In this case, as shown, the contacts list 1204 can include separate entries—a host contact 1402 and a participant contact 1404. When selected, therefore, the host contact 1402 automatically uses the host code 1010 and the participant contact 1404 automatically uses the participant code 1012. In this configuration, the system can provide one-click conference calling (selecting the appropriate conference contact 1402, 1404).

Figure 15A:
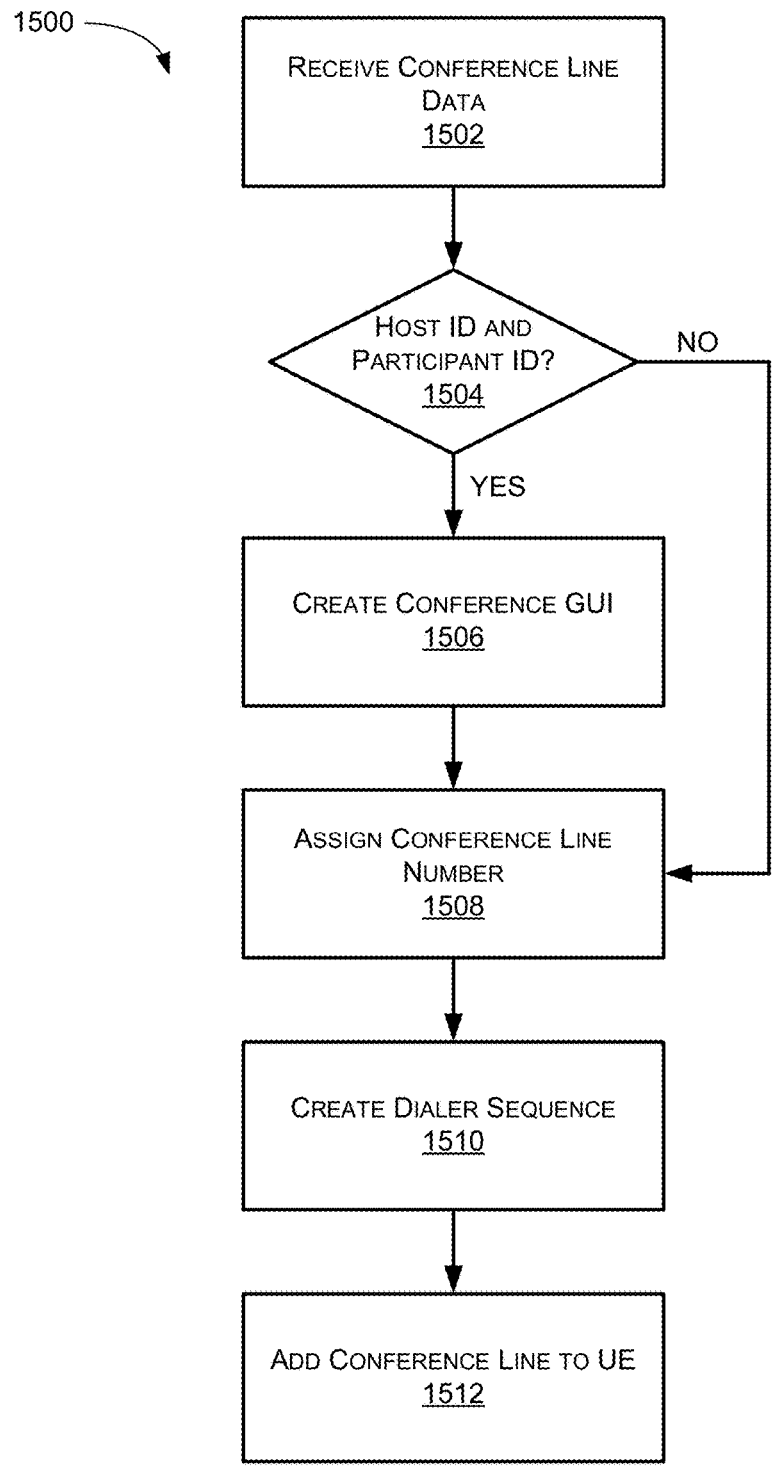
FIGS. 15A and 15B depict a method for creating (FIG. 15A) and using (FIG. 15B) a conference line, in accordance with some examples of the present disclosure.

Examples of the present disclosure can also comprise a method 1500 for storing (FIG. 15A) and using (FIG. 15B) a conference line 106. As shown in FIG. 15A, at 1502, the user can provide the necessary data for connecting to the conference bridge. As discussed above, this can include, for example, the conference bridge number 308 for the conference bridge, host code 310, and/or participant code 312. In some examples the user may also provide additional data such as, for example, a line name 302, line icon 304, and line color 306, to enable the user to more easily identify the conference line 106 in use.

At 1504, the method can determine if the user has entered both a host code 310 and a participant code 312. At 1506, if the user has entered both codes 310, 312, the method 1500 can create the conference GUI 800, which will be used below to determine how the user wishes to connect the conference line 106 (i.e., as a host or a participant). In other words, when the user selects the conference line 106 for use, if the user has entered both codes 310, 312, the conference GUI 800 will appear to solicit a selection of either the host code 310 or the participant code 312 from the user.

Figure 17A:
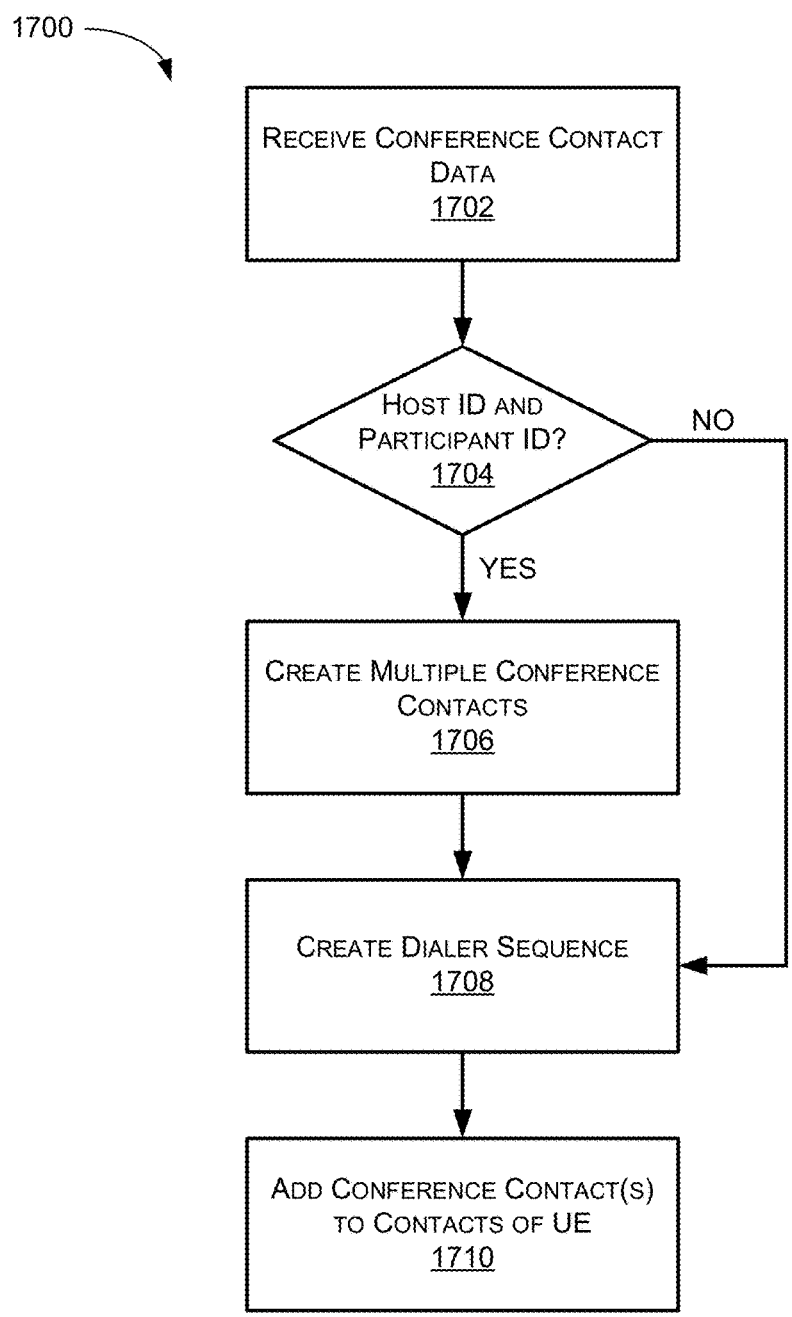
FIGS. 17A and 17B depict a method for creating (FIG. 16A) and using (FIG. 16B) two separate conference contacts, one for the host code and one for the participant code, in accordance with some examples of the present disclosure.

At 1508, the method 1500 can assign a conference bridge number 308 to the conference line 106. In some examples, the conference bridge number 308 can be provided by contacting a backend server of the service provider (e.g., a third generation partnership project authentication, authorization, and accounting (3GPP AAA) server). In other examples, the conference bridge number 308 can be based on a sequence from the other numbers on the UE 100 (e.g., the numbers for the personal line 102 and/or business line 104). In some examples, the SIM 1724 and/or the transceiver(s) of the UE 100 can store or access, respectively, the conference bridge number 308. See, FIG. 17, below.

At 1510, the method 1500 can create a dialer sequence for the dialer 600 to access the conference bridge associated with the conference line 106, including any necessary pauses and symbols. So, for example, the conference bridge may require a pause in between entries (e.g., between dialing the conference bridge number 308 and entering the host code 310). If the conference bridge number 308 is (362)-555-1212, for example, and the host ID 312 is 12345678 and requires a pound at the end, the dialer sequence may be "3625551212, 12345678#", where the commas create a pause for a predetermined amount of time (e.g., 1, 3, or 5 seconds).

In some examples, the dialer sequence may include additional letters, symbols, or numbers as required by the conference bridge. To ensure the conference bridge receives the host ID accurately, the dialer sequence may include additional pauses. In this configuration, the dialer sequence may be, "3625551212, 1.2.3.4.5.6.7.8#", where each "." inserts a brief delay (e.g., 0.25, 0.5, or 1 second) between each number. Of course, these symbols are somewhat arbitrary and could be other symbols without departing from the spirit of the disclosure.

At 1512, the method 1500 can add the conference line 106 to the UE 100. See, FIG. 5. As shown, on the settings screen, for example, the conference line 106 can be listed along with other lines on the UE 100 (e.g., the personal line 102 and/or business line 104). As discussed with reference to FIGS. 6 and 7, the conference line 106 can also be added to a line selector 610 to enable the user to select and use the conference line 106 when desired.

Figure 15B:
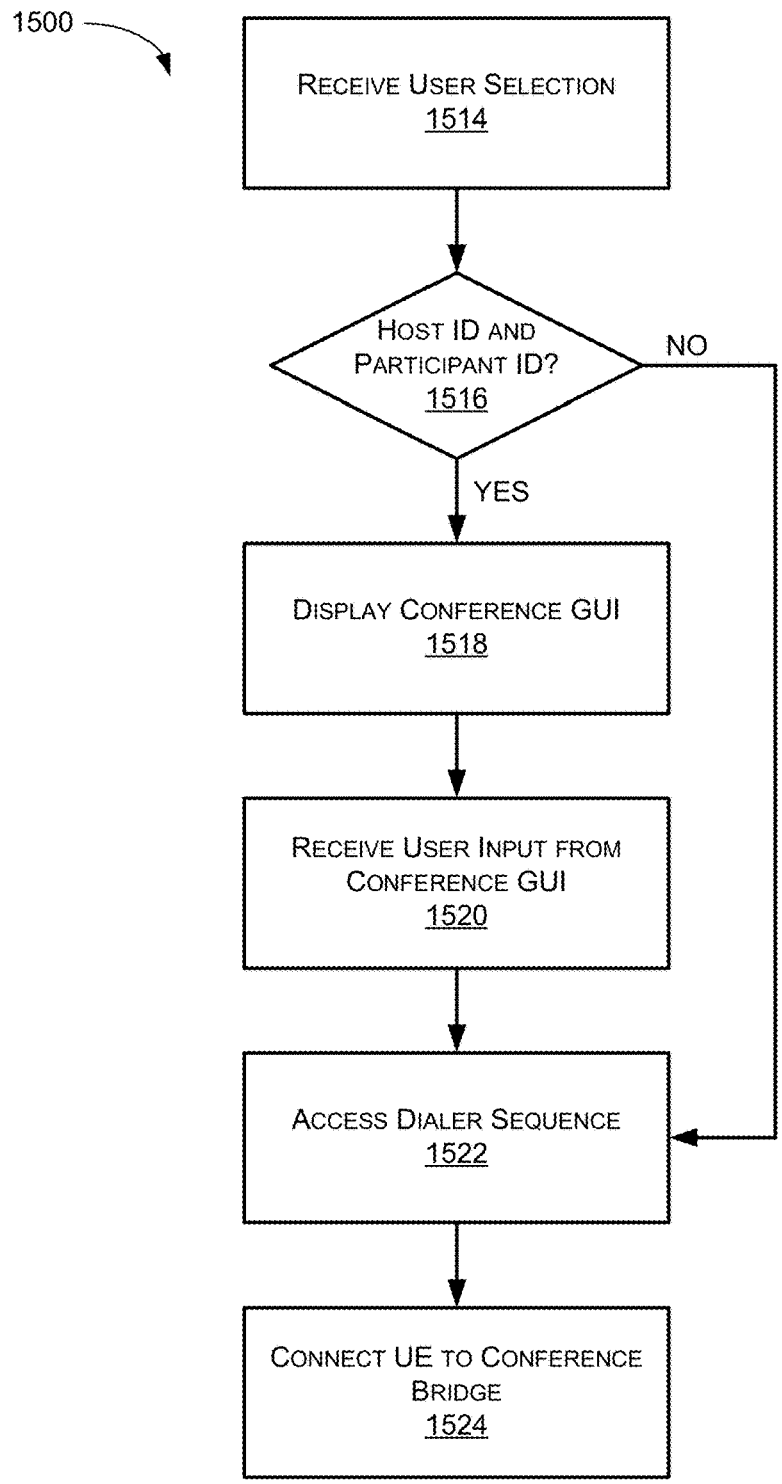

As shown in FIG. 15B, at 1514, to use the conference line 106, the method 1500 can receive the appropriate input from the user. As discussed above, this can include selecting the conference line 106 from a list, in a drop-down menu, or other similar means. At 1516, the method 1500 can again determine if the selected conference line 106 includes both a host code 310 and a participant code 312. At 1518, if the conference line 106 includes both codes 310, 312, the method 1500 can present the user with the conference GUI 800 to elicit a selection from the user as to which code 310, 312 the user wishes to user to connect to the conference bridge. To this end, at 1520, the method 1500 can receive the user input. In some cases, the user may select the host code 310 or participant code from a list (FIG. 8), a drop down menu, a button, voice command, or other suitable means.

Of course, if the conference line 106 only includes one of the codes 310, 312, steps 1518 and 1520 can be skipped. Regardless, at 1522, after receiving the user's input (if applicable), the method 1500 can access the appropriate dialer sequence, as discussed above. At 1524, the method 1500 can use the dialer sequence via the dialer 600, transceiver(s) 1718, and other components to connect the UE 100 to the selected conference bridge in the selected manner (i.e., as a host or participant).

Figure 16A:
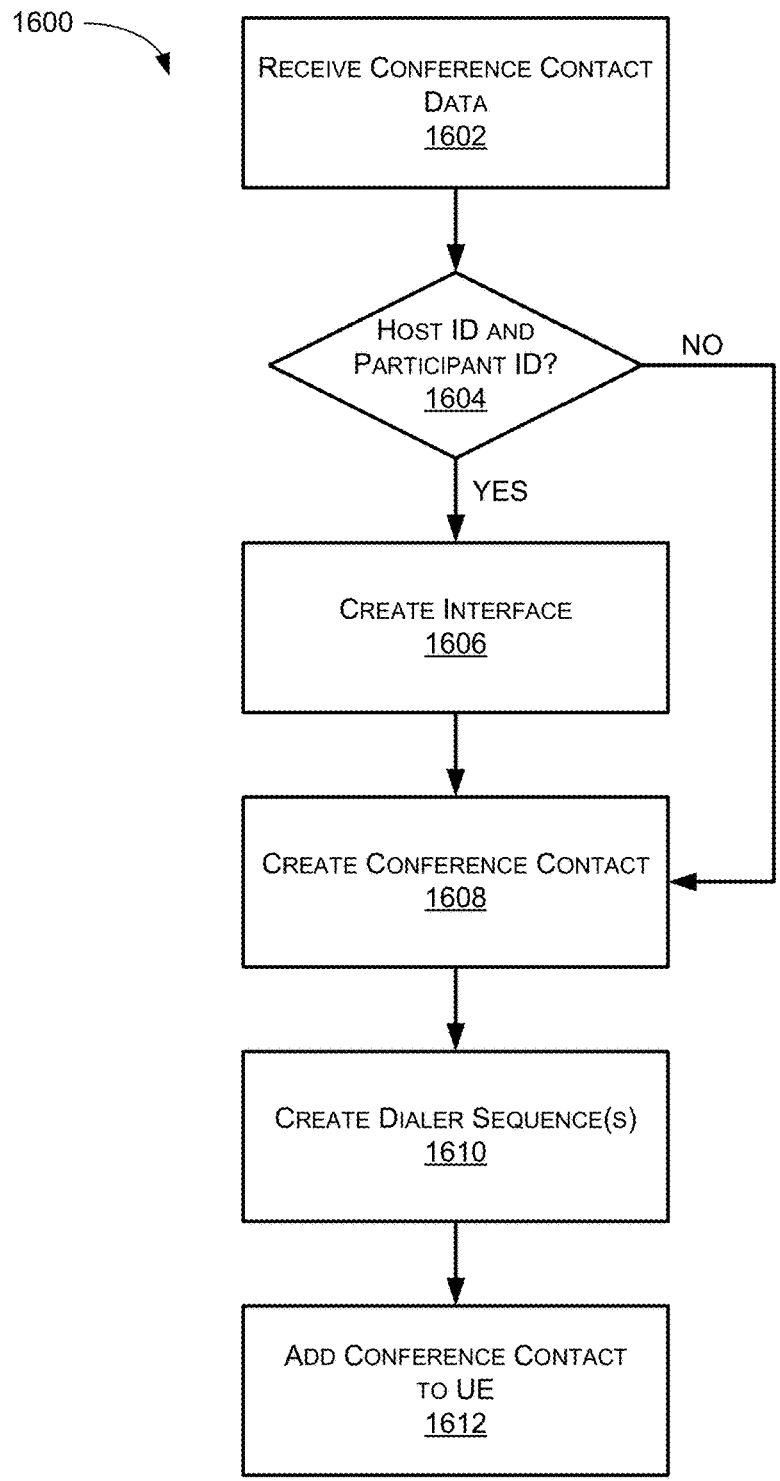
FIGS. 16A and 16B depict a method for creating (FIG. 16A) and using (FIG. 16B) a conference contact that includes both a host code and a participant code in the same contact, in accordance with some examples of the present disclosure.

Examples of the present disclosure can also comprise a method 1600 for storing (FIG. 16A) and using (FIG. 16B) a conference contact 1202 that includes both a host code 1010 and a participant code 1012. As shown in FIG. 16A, at 1602, the user can provide the necessary conference bridge information 1002 for connecting to the conference bridge. As discussed above, this can include, for example, the conference bridge number 1008, host code 1010, and/or participant code 1012. In some examples the user may also provide additional data such as, for example, a conference contact name 1004, conference avatar 1016, and a conference contact company 1006, among other things.

At 1604, the method can determine if the user has entered both a host code 1010 and a participant code 1012. At 1606, if the user has entered both codes 1010, 1012, the method 1600 can create the interface 1302, which will be used below to determine how the user wishes to connect to the conference bridge (i.e., as a host or a participant). In other words, when the user selects the conference contact 1202 for use, if the user has entered both codes 1010, 1012, the interface 1302 will appear to solicit a selection of either the host code 1010 or the participant code 1012 from the user.

At 1608, the method 1600 can create the conference contact 1202, including the host code 1010 and/or the participant code 1012. In this configuration, when both codes 1010, 1012 are entered, the method 1600 can create a single conference contact that includes both codes 1010, 1012. At 1610, the method 1600 can create one or more dialer sequences (e.g., one for each code 1010, 1012, as applicable) for the dialer 600 to access the conference bridge associated with the conference contact 1202, including any necessary pauses and symbols. So, for example, the conference bridge may require a pause in between entries (e.g., between dialing the conference bridge number 1008 and entering the host code 1010). If the conference bridge number 1008 is (362)-555-1212, for example, and the host ID 312 is 12345678 and requires a pound at the end, the dialer sequence may be "3625551212, 12345678#", where the commas create a pause for a predetermined amount of time (e.g., 1, 3, or 5 seconds).

In some examples, the dialer sequence may include additional letters, symbols, or numbers as required by the conference bridge. To ensure the conference bridge receives the host ID accurately, the dialer sequence may include additional pauses. In this configuration, the dialer sequence may be, "3625551212, 1.2.3.4.5.6.7.8#", where each "." inserts a brief delay (e.g., 0.25, 0.5, or 1 second) between each number. Of course, these symbols are somewhat arbitrary and could be other symbols without departing from the spirit of the disclosure.

At 1610, the method 1600 can add the conference contact 1202 to the contacts list 1604 of the UE 100. See, e.g., FIG. 12. As shown, the conference contact 1202 can be listed along with other contacts on the UE 100 and can work in essentially the same manner (i.e., selecting a particular conference contact 1202 initiates a call to that conference bridge). In the case of a conference contact 1202 that contains both codes 1010, 1012, however, selecting the conference contact 1202 will invoke the interface 1302.

Figure 16B:
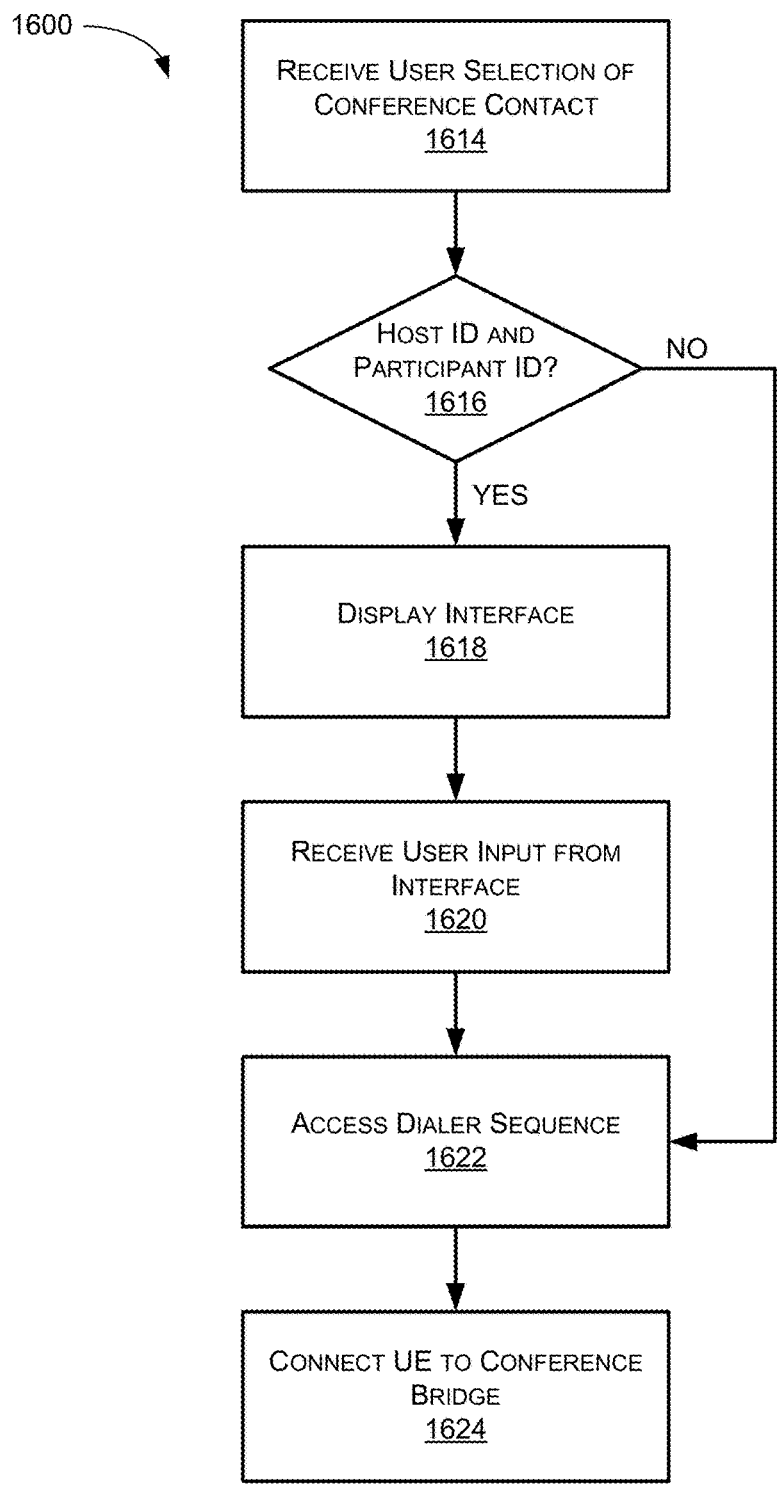

As shown in FIG. 16B, at 1614, to use the conference contact 1202, the method 1600 can receive the appropriate input from the user. As discussed above, this can include selecting the conference contact 1202 from the contact list 1604, for example, or receiving a voice command. At 1616, the method 1600 can determine if the selected conference contact 1202 includes both a host code 1010 and a participant code 1012. At 1618, if the conference contact 1202 includes both codes 1010, 1012, the method 1600 can present the user with the interface 1302, which can include the host button 1304 and the participant button 1306, for example, to elicit a selection from the user as to which code 1010, 1012 the user wishes to user to connect to the conference bridge. To this end, at 1620, the method 1600 can receive the user input. In some cases, rather than using the buttons 1304, 1306, the user may select the host code 1010 or participant code from a list, a drop down menu, a button, voice command, or other suitable means associated with the conference contact 1202.

Of course, if the conference contact 1202 includes only one of the codes 1010, 1012, steps 1618 and 1620 can be skipped. At 1622, after receiving the user's input (if applicable), the method 1600 can access the appropriate dialer sequence. If the conference contact 1202 includes only one of the codes 1010, 1012, the method 1600 can access the single code 1010, 1012. If the conference contact 1202 includes both codes 1010, 1012, on the other hand, the method 1600 can select the dialer sequence associated with the user's selection. At 1624, the method 1600 can use the dialer sequence via the dialer 600, transceiver(s) 1718, and other components to connect the UE 100 to the selected conference bridge in the selected manner (i.e., as a host or participant).

Examples of the present disclosure can also include a method 1700 to create and use one or more conference contact 1202, where each conference contact contains only a single code 1010, 1012. In other words, rather than creating a single conference contact 1202 that contains both codes 1010, 1012, as discussed above, the method 1700 can simply create two separate contacts, one for each code 1010, 1012. Each of these contacts 1202 may have the same conference bridge number 1008, conference contact name 1004, and other common data, but one conference contact 1202 will contain only the host code 1010 and the other conference contact 1202 will only contain the participant code 1012.

At 1702, therefore, the user can provide the necessary conference bridge information 1002 for connecting to the conference bridge. As discussed above, this can include, for example, the conference bridge number 1008 for the conference bridge, host code 1010, and/or participant code 1012. As before, the user may also provide additional data such as, for example, a conference contact name 1004, conference avatar 1016, and a conference contact company 1006, among other things.

At 1704, the method can determine if the user has entered both a host code 1010 and a participant code 1012. At 1706, if the user has entered both codes 1010, 1012, in some examples, the method 1700 can create two conference contacts 1402, 1404, one for each code 1010, 1012. In this configuration, each conference contact 1402, 1404 will have essentially the same conference bridge information 1002, except that one conference contact 1402 will include the host code 1010 and no participant code 1012 and the other conference contact 1404 will contain the participant code 1012 and no host code 1010. In this manner, the user need not select which code 1010, 1012 to use when selecting a particular conference contact 1402, 1404—it is included in the contact.

At 1708, the method 1700 can create a dialer sequence for the dialer 600 to access the conference bridge associated with the conference contact 1402, 1404, including any necessary pauses and symbols. So, for example, the conference bridge may require a pause in between entries (e.g., between dialing the conference bridge number 1008, and entering the host code 1010). If the conference bridge number 1008 is (602)-555-1212, for example, and the host ID 1012 is 121045678 and requires a pound at the end, the dialer sequence may be "6025551212, 121045678#", where the commas create a pause for a predetermined amount of time (e.g., 1, 10, or 5 seconds).

In some examples, the dialer sequence may include additional letters, symbols, or numbers as required by the conference bridge. To ensure the conference bridge receives the host ID accurately, the dialer sequence may include additional pauses. In this configuration, the dialer sequence may be, "6025551212, 1.2.10.4.5.6.7.8#", where each "." inserts a brief delay (e.g., 0.25, 0.5, or 1 second) between each number. Of course, these symbols are somewhat arbitrary and could be other symbols without departing from the spirit of the disclosure.

At 1710, the method 1700 can add the conference contact (s) 1402, 1404 to the contacts list 1204 of the UE 100. See, e.g., FIG. 14. As shown, each conference contact 1402, 1404 can be listed along with other contacts on the UE 100 and can work in essentially the same manner (i.e., selecting a particular conference contact 1202 initiates a call to that conference bridge). In this configuration, because each conference contact 1402, 1404 includes only one of the codes 1010, 1012, however, no further input from the user is required.

Figure 17B:
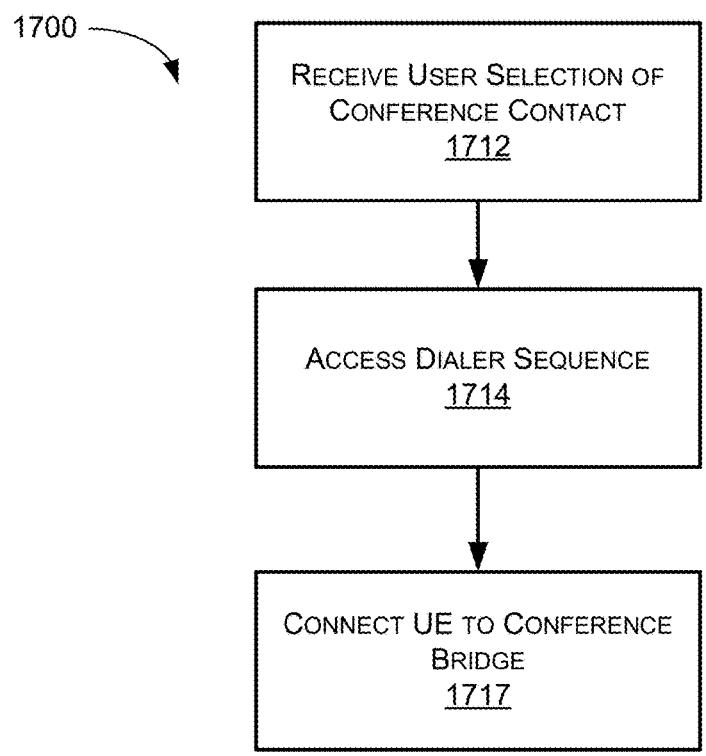

As shown in FIG. 17B, at 1712, to use the conference contact 1402, 1404, the method 1700 can receive the appropriate input from the user. As discussed above, this can include selecting the conference contact 1402, 1404 from amongst the user's other contacts, similar to a regular call. If two conference contacts 1402, 1404 were created, one for each code 1010, 1012, then both can appear in the contacts list 1204 on the UE 100. As discussed above, because each conference contact 1402, 1404 contains only one code 1010, 1012, all that is required is that the user select the desired contact 1402, 1404 (i.e., a conference GUI 800 or interface 1302 is not needed).

To this end, at 1714, the method 1700 can access the dialer sequence for the conference contact 1402, 1404 selected, including the appropriate code 1010, 1012. At 1717, the method 1700 can use the dialer sequence via the dialer 600, transceiver(s) 1718, and other components to connect the UE 100 to the selected conference bridge in the selected manner (i.e., as a host or participant).

Figure 18:
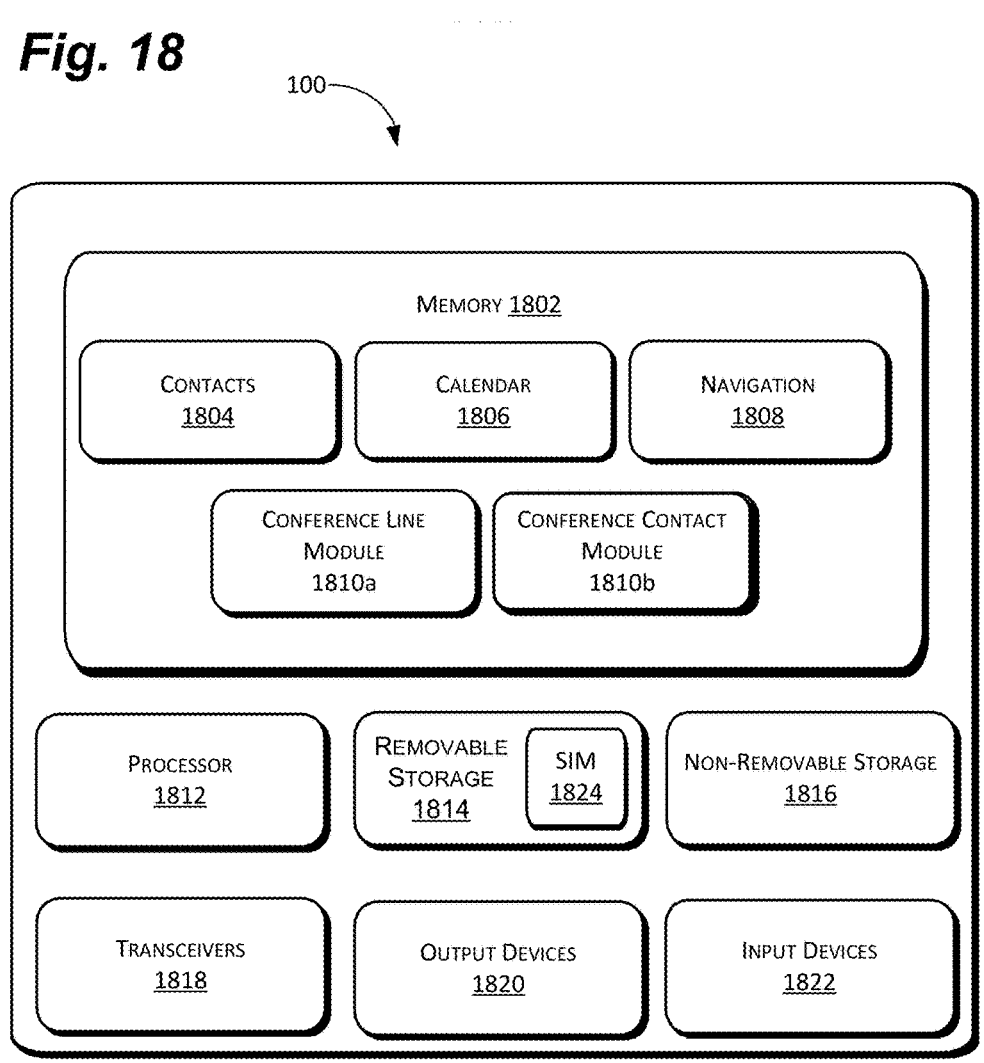
FIG. 18 depicts a UE for use with the system, in accordance with some examples of the present disclosure.

As shown in FIG. 18, any or all of the GUIs 200, 300, 800, 900, 1000 and methods 1500, 1600 can be implemented on a variety of electronic devices, such as cell phones, smart phones, tablet computers, and laptops (collectively, UE 100). The UE 100 can comprise a number of components to enable the GUIs 200, 300, 800, 900, 1000 and methods 1500, 1600, among other things, to perform the above-mentioned functions. As discussed below, the UE 100 can comprise memory 1802 including many common features such as, for example, the UE's contacts 1804, calendar 1806, and navigation software 1808. In addition, the memory 1802 can also include a conference line module 1810a. The UE 100 can also include one or more processor(s) 1812, removable storage 1814, non-removable storage 1816, transceiver(s) 1818, output device(s) 1820, and input device(s) 1822. In some examples, such as for cellular communication devices, the UE 100 can also include a subscriber identity module (SIM) 1824 including an International Mobile Subscriber Identity (IMSI), among other things. In some examples, some, or all, of the functions associated with the GUIs 200, 300, 800, 900, 1000 and methods 1500, 1600 can also be handled by a remote server or other remote network entity.

In various implementations, the memory 1802 can be volatile (such as random access memory (RAM)), non-volatile (such as read only memory (ROM), flash memory, etc.), or some combination of the two. The memory 1802 can include all, or part, of the GUIs 200, 300, 800, 900, 1000 and methods 1500, 1600, the functions 1804, 1806, 1808 and modules 1810a, 1810b, and an operating system (OS) for the UE 100, among other things.

The memory 1802 can also comprise contacts 1804. The contacts 1804 can include names, numbers, addresses, and other information about the user's business and personal acquaintances, among other things. As discussed above, in some configurations, the contacts 1804 can also include one or more conference contacts 1202. In this configuration, as discussed above, the user can access conference bridges simply by selecting a conference contact 1202 from the contacts 1804. The conference contact 1202 can then automatically dial the related conference bridge number 1008 and host code 1010 or participant code 1012.

In some examples, the memory 1802 can also include a calendar 1806, or other software, to enable the user to track appointments and calls, schedule meetings, and provide similar functions. In some examples, the memory 1802 can also comprise navigation software 1808 such as global positioning system (GPS) and/or cellular location based navigation systems. Of course, the memory 1802 can also include other software such as, for example, e-mail, text messaging, social media, and utilities (e.g., calculators, clocks, compasses, etc.).

The UE 100 can also include a conference line module 1810a and/or a conference contact module 1810b. The conference line module 1810a can enable the user to add a conference line 106, as discussed above. This can include, for example, adding additional number to the IMSI associated with the SIM 1824, and storing the associated conference bridge number 308, host code 310, and/or participant code 312 for the conference bridge associated with the conference line 106.

As discussed above with reference to FIG. 15, the conference line module 1810a can also provide the necessary pauses and codes for use with the conference line 106. In other words, when the user selects the conference line 106, the conference line module 1810a can receive the user's input, and then provide the necessary data—e.g., the conference bridge number 308, host code 310, and/or participant code 312—along with any required or desired pauses and/or symbols (e.g., * or #) necessary to connect the UE 100 to the conference bridge.

In some examples, the conference line module 1810a can also configure the transceiver 1818 to communicate using the conference line 106 phone number, as opposed to the personal line 102 or business line 104 phone numbers. In this manner, when the user selects the conference line 106, the correct phone number appears on the caller ID for the conference bridge and/or to other participants.

Similarly, the conference contact module 1810b can provide many of the same functions as the conference line module 1810a. In this case, however, rather than creating a separate conference line 106, the conference contact module 1810b can create one or more conference contacts 1202 in the UE's contacts 1804. As discussed above, the conference contact module 1810b can receive the conference bridge number 1008, host code 1010, and/or participant code 1012 and create one or more conference contacts 1202.

In other words, if the user enters only a host code 1010 or a participant code 1012, the conference contact module 1810b can create a single conference contact 1202 with this information. If the user enters both a host code 1010 and a participant code 1012, then the conference contact module 1810b can (1) create two conference contacts 1402, 1404, one for each code 1010, 1012, or (2) provide an interface 1302 to enable the user to select the preferred code 1010, 1012 for a particular conference call.

As discussed above with reference to FIG. 16, the conference contact module 1810b can also store the necessary pauses and codes to enable the conference bridge to detect the host code 1010 or participant code 1012. In other words, when the user selects a conference contact 1202, the conference contact module 1810b can receive the user's input, and then provide the necessary data—e.g., the conference bridge number 308, host code 1010, and/or participant code 1012—along with any required or desired pauses and/or symbols (e.g., * or #) necessary to connect the UE 100 to the conference bridge.

The UE 100 may also include additional data storage devices (removable and/or non-removable) such as, for example, magnetic disks, optical disks, or tape. Such additional storage is illustrated in FIG. 18 by removable storage 1814 and non-removable storage 1816. The removable storage 1814 and non-removable storage 1816 can store the various programs 1804, 1806, 1808, 1810 and GUIs 200, 300, 800, 900, 1000 and methods 1500, 1600. This can enable the UE 100 to be fully or partially configured and to enable the GUIs 200, 300, 800, 900, 1000 and methods 1500, 1600 to present welcome screens, setup menus, GUIs, and other functions to the user via the GUIs 200, 300, 800, 900, 1000 and methods 1500, 1600, OS, and other programs and functions.

Non-transitory computer-readable media may include volatile and nonvolatile, removable and non-removable tangible, physical media implemented in technology for storage of information, such as computer readable instructions, data structures, program modules, or other data. The memory 1802, removable storage 1814, and non-removable storage 1816 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 100. Any such non-transitory computer-readable media may be part of the UE 100 or may be a separate database, databank, remote server, or cloud-based server.

In some implementations, the transceiver(s) 1818 include any sort of transceivers known in the art. In some examples, the transceiver(s) 1818 can include wireless modem(s) to facilitate wireless connectivity with the other UEs, the Internet, and/or an intranet via a cellular connection. Further, the transceiver(s) 1818 may include a radio transceiver that performs the function of transmitting and receiving radio frequency communications via an antenna (e.g., Wi-Fi or Bluetooth®). In other examples, the transceiver(s) 1818 may include wired communication components, such as a wired modem or Ethernet port, for communicating with the other UEs or the provider's Internet-based network.

In some implementations, the output device(s) 1820 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE 100 is connected to a network, the type of call being received (e.g., video calls vs. voice calls), the number of active calls, etc. Output device(s) 1820 also include ports for one or more peripheral devices, such as headphones, peripheral speakers, or a peripheral display.

In various implementations, input device(s) 1822 include any sort of input devices known in the art. For example, the input device(s) 1822 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

In some examples, particularly for cellular enabled devices, the UE 100 can removable storage 1814 can include a SIM 1824. As usual, the SIM 1824 can store the users IMSI for identification, and other pertinent data, for communication over one or more cellular networks. In some cases, the some or all of the contacts 1804 can also be stored in the SIM 1824. In addition, the phone numbers associated with the UE 100 or the personal line 102, business line 104, and/or conference line 106 can also be stored on the SIM 1824. In this manner, the conference line module 1810a can choose the appropriate line 102, 104, 106, for example, via the SIM 1824 based on user input.

The GUI 200 and methods 1200 described above provide a simple, robust, and easy to install communications uplink to provide additional communications and data bandwidth in high-demand, but possibly temporary, locations. Thus, the GUIs 200, 300, 800, 900, 1000 and methods 1500, 1600 described can be used anytime convenient access to conference services are needed. The systems and methods described herein provide simple, one- or two-touch access to what is normally a complicated 21-34 (or more) digit dialing process.

While several possible examples are disclosed above, examples of the present disclosure are not so limited. For instance, while the systems and methods above are discussed with reference to use with cellular data and communications, the systems and methods can be used with other types of wireless data and communications system. In addition, while the various controls and buttons are generally shown as selectable buttons on a touchscreen for a UE 100, these controls and buttons could easily be inputs from actual, physical button, voice commands, or other types of interfaces.

In addition, the location and configuration used for various features of examples of the present disclosure such as, for example, the order of the steps used, the components and layout of the various GUIs 200, 300, 800, 900, 1000, and other features can be varied according to a particular conference bridge, UE, or communications network, among other things. Such changes are intended to be embraced within the scope of this disclosure.

The specific configurations, machines, and the size and shape of various elements can be varied according to particular design specifications or constraints requiring a GUI, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   providing a first graphical user interface (GUI) on a user equipment (UE) for creating one or more conference lines;
   receiving, via an input on the UE, conference line data, the conference line data comprising a conference phone number, a host code, and a participant code;
   creating, with a conference line module of a processor on the UE, a dialer sequence to enable the UE to connect to a conference bridge;
   adding a conference line to the UE, including the conference line data, as a first conference contact that includes the conference phone number and the host code and as a second conference contact that includes the conference phone number and the participant code; and
   displaying the added conference line on a second GUI on the UE.

2. The method of claim 1, further comprising:
   creating a conference line GUI configured to receive, from an input on the UE, a selection regarding using the host code or the participant code to connect to the conference bridge.

3. The method of claim 2, wherein the conference line enables the UE to connect to the conference bridge using two or fewer clicks.

4. The method of claim 2, further comprising:
   receiving a selection from an input on the UE to activate the conference line;

displaying, on a display of the UE, a conference line GUI configured to receive, via an input on the UE, a selection of a host code or a participant code;

accessing, with the conference line module, the dialer sequence associated with the selected host code or participant code; and dialing, with a transceiver, a plurality of numbers and/or symbols contained in the dialer sequence to connect the UE to the conference bridge with the selected host code or participant code.

5. The method of claim 1, wherein the conference line enables the UE to connect to the conference bridge with one click.

6. The method of claim 1, further comprising:

receiving a selection, via an input on the UE, to activate the conference line;

accessing, with the conference line module, the dialer sequence; and dialing, with a transceiver, a plurality of numbers and/or symbols contained in the dialer sequence to connect the UE to the conference bridge.

7. The method of claim 1, wherein the dialer sequence includes at least one number or symbol to create a pause in the dialer sequence.

8. A method comprising:

providing a first graphical user interface (GUI), on a display on a user equipment (UE), for receiving conference bridge information;

receiving, via an input on the UE, conference bridge information, the conference bridge information comprising a conference phone number, a host code, and a participant code;

creating, with a conference contact module of a processor on the UE, a first dialer sequence to enable the UE to connect to a conference bridge; and adding, with the conference contact module, a first conference contact including the conference phone number and the host code and a second conference contact including the conference phone number and the participant code to a contact list on the UE.

9. The method of claim 8, further comprising:

creating, with the conference contact module of the processor on the UE, a second dialer sequence to enable the UE to connect to the conference bridge; and creating an interface configured to receive, from an input on the UE, a selection regarding using the host code or the participant code to connect to the conference bridge;

wherein the first dialer sequence includes one of the host code or the participant code; and wherein the second dialer sequence includes the other of the host code or the participant code.

10. The method of claim 9, further comprising:

receiving, via a keyboard, touchscreen, or voice command on the UE and associated with the interface, a selection of the first conference contact or the second conference contact;

accessing, with the conference contact module, a selected dialer sequence associated with the selected conference contact; and dialing, with a transceiver, a plurality of numbers and/or symbols contained in the selected dialer sequence to connect the UE to the conference bridge;

wherein the selected dialer sequence comprises the first dialer sequence or the second dialer sequence.

11. The method of claim 8, wherein the first conference contact or the second conference contact enables the UE to connect to the conference bridge using two or fewer clicks.

12. The method of claim 8, wherein the first conference contact or the second conference contact enables the UE to connect to the conference bridge with one click.

13. A user equipment (UE) comprising:

a display to display a graphical user interface (GUI) to enable creation of conference contacts;

one or more input devices to receive at least conference bridge information;

one or more transceivers to connect to a conference bridge using a dialer sequence associated with the conference bridge information;

one or more processors in communication with at least the display, the one or more transceivers, and the one or input devices; and memory storing computer-executable instructions that, when executed, cause the one or more processors to:

display the GUI on the display to solicit conference bridge information;

receive, via the one or more input devices, conference bridge information, the conference bridge information comprising a conference phone number, a host code, and a participant code;

create, with a conference contact module of the one or more processors, a first dialer sequence to enable the one or more transceivers to connect to the conference bridge;

adding, with the conference contact module, a first conference contact including the conference phone number and the host code and a second conference contact including the conference phone number and the participant code to a contact list on the UE.

14. The UE of claim 13, further comprising:

a dialer to cause the one or more transceivers to execute the dialer sequence;

wherein the dialer sequence comprises a first symbol, the first symbol causing the dialer to dial a first group of one or more numbers or symbols, pause for a first predetermined time, and then dial a second group of one or more numbers or symbols.

15. The UE of claim 14, wherein the dialer sequence comprises a second symbol, the second symbol to cause a dialer to dial a third group of one or more numbers or symbols, pause for a second predetermined time, and then dial a fourth group of one or more numbers or symbols; and wherein the second predetermined time is shorter than the first predetermined time.

16. The UE of claim 14, wherein the conference bridge information further comprises a conference avatar associated with the first conference contact or the second conference contact.

* * * * *